(12) United States Patent
Ekambaram et al.

(10) Patent No.: US 12,313,115 B2
(45) Date of Patent: May 27, 2025

(54) ROTOR BEARING DESIGN FOR DOWNHOLE MOTORS

(71) Applicant: Schlumberger Technology Corporation, Sugar Land, TX (US)

(72) Inventors: Raju Ekambaram, Singapore (SG); You Cheng Jee, Singapore (SG); Arthur I. Watson, Sugar Land, TX (US); Pradeep Mahadevan, Singapore (SG)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/553,225

(22) PCT Filed: Mar. 31, 2022

(86) PCT No.: PCT/US2022/022765
§ 371 (c)(1),
(2) Date: Sep. 29, 2023

(87) PCT Pub. No.: WO2022/212660
PCT Pub. Date: Oct. 6, 2022

(65) Prior Publication Data
US 2024/0175465 A1    May 30, 2024

Related U.S. Application Data

(60) Provisional application No. 63/168,804, filed on Mar. 31, 2021.

(51) Int. Cl.
*F16C 17/02* (2006.01)
*F16C 27/02* (2006.01)
(Continued)

(52) U.S. Cl.
CPC .............. *F16C 17/02* (2013.01); *F16C 27/02* (2013.01); *F16C 35/02* (2013.01); *H02K 5/132* (2013.01);
(Continued)

(58) Field of Classification Search
CPC .......... F16C 17/02; F16C 27/02; F16C 35/02; F16C 2206/82; F16C 2360/44;
(Continued)

(56) References Cited

U.S. PATENT DOCUMENTS 4,513,215 A   4/1985 Del Serra
5,003,210 A * 3/1991 Liu ........................ H02K 5/167
                                                     310/90

(Continued)

OTHER PUBLICATIONS

International Search Report and Written Opinion issued in the PCT Application PCT/US2022/022765, dated Jul. 12, 2022 (10 pages).

(Continued)

*Primary Examiner* — Phillip A Johnson
(74) *Attorney, Agent, or Firm* — Jeffrey D. Frantz

(57) ABSTRACT

Rotor bearings are provided. The motor bearing can be used in an electric submersible pump motor. The bearing can include a body and one or more anti-rotation pins disposed partially in a groove in an outer surface of the body and configured to be received in a corresponding keyway in an inner diameter of a stator. The anti-rotation pin prevents or inhibits rotation of the bearing relative to the stator.

18 Claims, 24 Drawing Sheets

(51) Int. Cl.
*F16C 35/02* (2006.01)
*H02K 5/132* (2006.01)
*H02K 5/167* (2006.01)
*E21B 43/12* (2006.01)

(52) U.S. Cl.
CPC ............ H02K 5/167 (2013.01); *E21B 43/128* (2013.01); *F16C 2352/00* (2013.01); *F16C 2380/26* (2013.01)

(58) Field of Classification Search
CPC . F16C 2380/26; F04D 29/0465; H02K 5/132; H02K 5/167; E21B 4/003; E21B 4/128
See application file for complete search history.

(56) References Cited

U.S. PATENT DOCUMENTS

| | | | | |
|---|---|---|---|---|
| 5,128,573 | A * | 7/1992 | Liu | H02K 5/167 310/90 |
| 9,951,810 | B2 * | 4/2018 | Parmeter | H02K 5/132 |
| 2014/0127052 | A1 | 5/2014 | Knapp | |
| 2015/0023815 | A1 | 1/2015 | Tetzlaff et al. | |
| 2015/0226219 | A1 | 8/2015 | Johnson et al. | |
| 2016/0053807 | A1 * | 2/2016 | Maciver | F16C 27/02 384/473 |
| 2019/0123609 | A1 | 4/2019 | Wilcox | |
| 2019/0186245 | A1 | 6/2019 | Bellmyer | |
| 2021/0285489 | A1 * | 9/2021 | Niina | H02K 5/167 |
| 2022/0341435 | A1 | 10/2022 | Mahadevan | |

OTHER PUBLICATIONS

Nitinol 2-Way memory coil springs, downloaded on Sep. 10, 2023 from link https://nexmetal.com/collections/nitinol-springs/products/nitinol-2-way-memory-coil-spring-w0-7-x-d9-x-c14-x-h85-af-45-60 (7 pages).

The elephants of material science: SMAs never forget their shape, downloaded on Sep. 27, 2023 from link, https://www.comsol.com/blogs/the-elephants-of-materials-science-smas-never-forget-their-shape/ (10 pages).

* cited by examiner

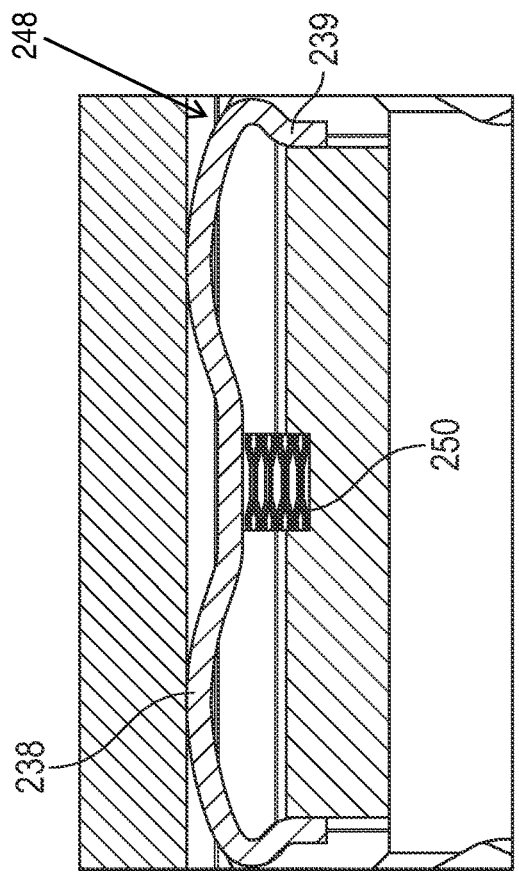
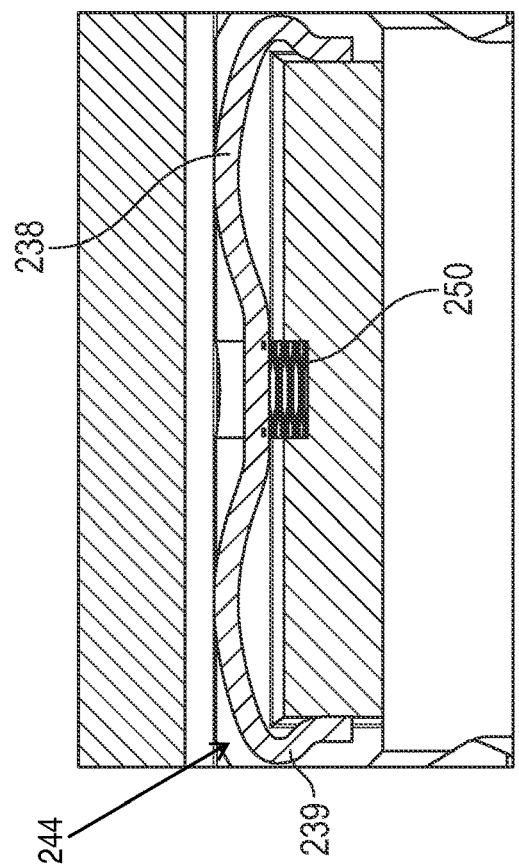
FIG. 19B
FIG. 19A

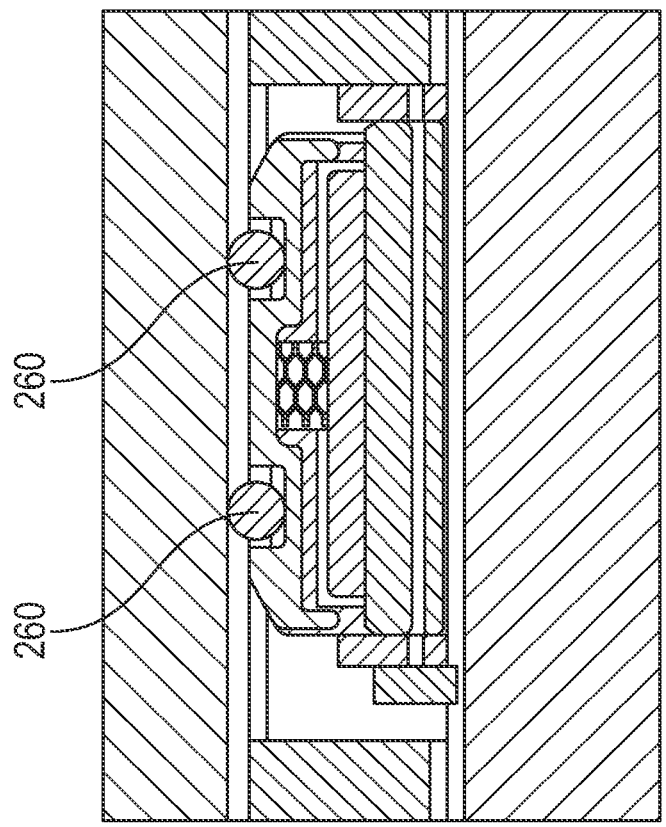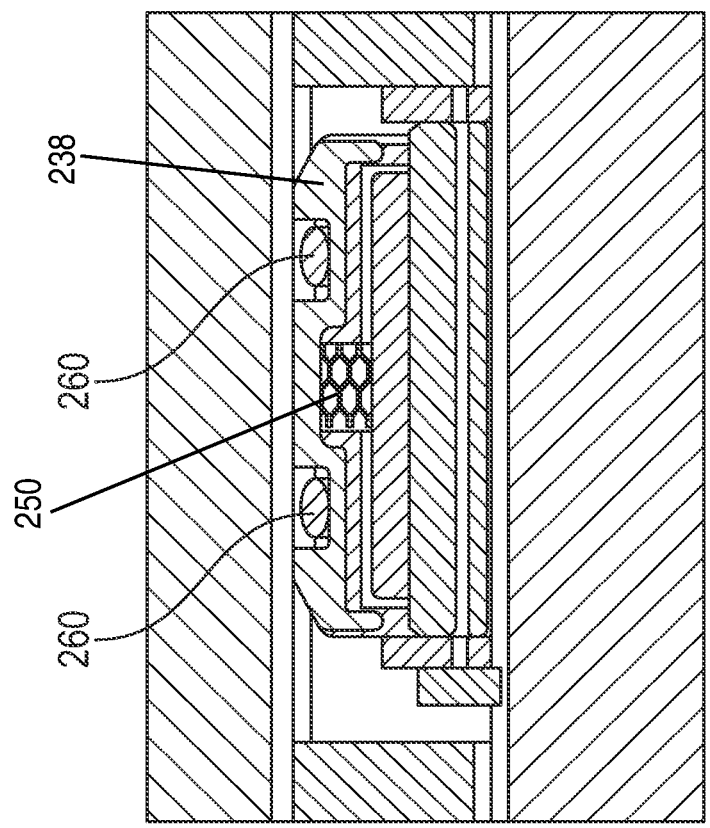

ROTOR BEARING DESIGN FOR DOWNHOLE MOTORS

CROSS-REFERENCE TO RELATED APPLICATIONS

Any and all applications for which a foreign or domestic priority claim is identified in the Application Data Sheet as filed with the present application are hereby incorporated by reference under 37 CFR 1.57. The present application is a National Stage of International Application No. PCT/US2022/022765, filed Mar. 31, 2022, which claims priority benefit of U.S. Provisional Application No. 63/168,804, filed Mar. 31, 2021, the entirety of each of which is incorporated by reference herein and should be considered part of this specification.

BACKGROUND

Field

The present disclosure generally relates to downhole motors, for example as found in electric submersible pumps, and more particularly to rotor bearing designs for downhole motors.

Description of the Related Art

Various types of artificial lift equipment and methods are available, for example, electric submersible pumps (ESPs). An ESP includes multiple centrifugal pump stages mounted in series, each stage including a rotating impeller and a stationary diffuser mounted on a shaft, which is coupled to a motor. In use, the motor rotates the shaft, which in turn rotates the impellers within the diffusers. Well fluid flows into the lowest stage and passes through the first impeller, which centrifuges the fluid radially outward such that the fluid gains energy in the form of velocity. Upon exiting the impeller, the fluid flows into the associated diffuser, where fluid velocity is converted to pressure. As the fluid moves through the pump stages, the fluid incrementally gains pressure until the fluid has sufficient energy to travel to the well surface.

SUMMARY

In some configurations, a motor bearing includes a body and an anti-rotation feature projecting radially outwardly from an outer surface of the body, the anti-rotation feature configured to be received in a corresponding keyway in an inner surface of a motor stator.

The body can include a groove in the outer surface of the body and extending axially along a length of the body, the anti-rotation feature disposed partially in the groove. The anti-rotation feature can be a solid pin or a coiled pin. The keyway of the motor stator can have a curved profile. The motor bearing can include at least one retaining ring disposed circumferentially about the outer surface of the body and configured to axially constrain the anti-rotation feature. The anti-rotation feature can be a spring-loaded stamped key. The motor bearing can include at least one retaining ring configured to secure the stamped key to the body, the at least one retaining ring disposed circumferentially about the stamped key such that a portion of the stamped key is disposed radially between the body and the at least one retaining ring.

The body can include or be made entirely of a hard material, for example, tungsten carbide ceramic. The body can include an inner bushing and an outer carrier disposed circumferentially about the inner bushing. A bushing retaining pin can be disposed at each axial end of the carrier and configured to secure the carrier to the inner bushing. The carrier can be metallic and the inner bushing can be a hard material, for example, tungsten carbide (WC) ceramic.

The motor bearing can include a centering mechanism configured to limit displacement of the motor bearing relative to the stator in use. The centering mechanism can include one or more metallic bands, elastomer bands, thermoplastic rings, or one or more retaining bands or rings made of a shape memory alloy. An inner surface of the body can have a circular or non-circular profile. An inner surface of the body can have a profile configured to inhibit sub-synchronous or oil whirl related vibration.

In some configurations, the motor bearing is included in an electric submersible pump motor.

In some configurations, a motor bearing includes a body comprising a groove in an outer surface of the body and extending axially along a length of the body; an anti-rotation mechanism disposed partially in the groove and projecting radially outwardly from the outer surface of the body, the anti-rotation pin configured to be received in a corresponding keyway in an inner surface of a motor stator; and a centering mechanism disposed circumferentially about the outer surface of the body and configured to limit displacement of the motor bearing relative to the stator in use.

The anti-rotation mechanism can include an anti-rotation pin or key. The centering mechanism can include one or more metallic bands, a shape memory alloy, elastomer bands, or thermoplastic rings. In some configurations, the centering mechanism extends over a portion of the anti-rotation mechanism, such that the portion of the anti-rotation mechanism is disposed radially between the body and the centering mechanism.

BRIEF DESCRIPTION OF THE FIGURES

Certain embodiments, features, aspects, and advantages of the disclosure will hereafter be described with reference to the accompanying drawings, wherein like reference numerals denote like elements. It should be understood that the accompanying figures illustrate the various implementations described herein and are not meant to limit the scope of various technologies described herein.

FIG. 19A shows a partial longitudinal cross-sectional view of the rotor bearing of FIG. 18A, with the spring in a compressed state.

FIG. 19B shows the view of FIG. 19A with the spring in an expanded state.

FIG. 28A shows a partial longitudinal cross-sectional view of an example rotor bearing including a SMA retaining ring in a deformed state at room temperature.

FIG. 28B shows the rotor bearing of FIG. 28A in an expanded state at operating temperature.

DETAILED DESCRIPTION

In the following description, numerous details are set forth to provide an understanding of some embodiments of the present disclosure. It is to be understood that the following disclosure provides many different embodiments, or examples, for implementing different features of various embodiments. Specific examples of components and arrangements are described below to simplify the disclosure. These are, of course, merely examples and are not intended to be limiting. However, it will be understood by those of ordinary skill in the art that the system and/or methodology may be practiced without these details and that numerous variations or modifications from the described embodiments are possible. This description is not to be taken in a limiting sense, but rather made merely for the purpose of describing general principles of the implementations. The scope of the described implementations should be ascertained with reference to the issued claims.

As used herein, the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down"; "upper" and "lower"; "top" and "bottom"; and other like terms indicating relative positions to a given point or element are utilized to more clearly describe some elements. Commonly, these terms relate to a reference point at the surface from which drilling operations are initiated as being the top point and the total depth being the lowest point, wherein the well (e.g., wellbore, borehole) is vertical, horizontal or slanted relative to the surface.

Figure 1:
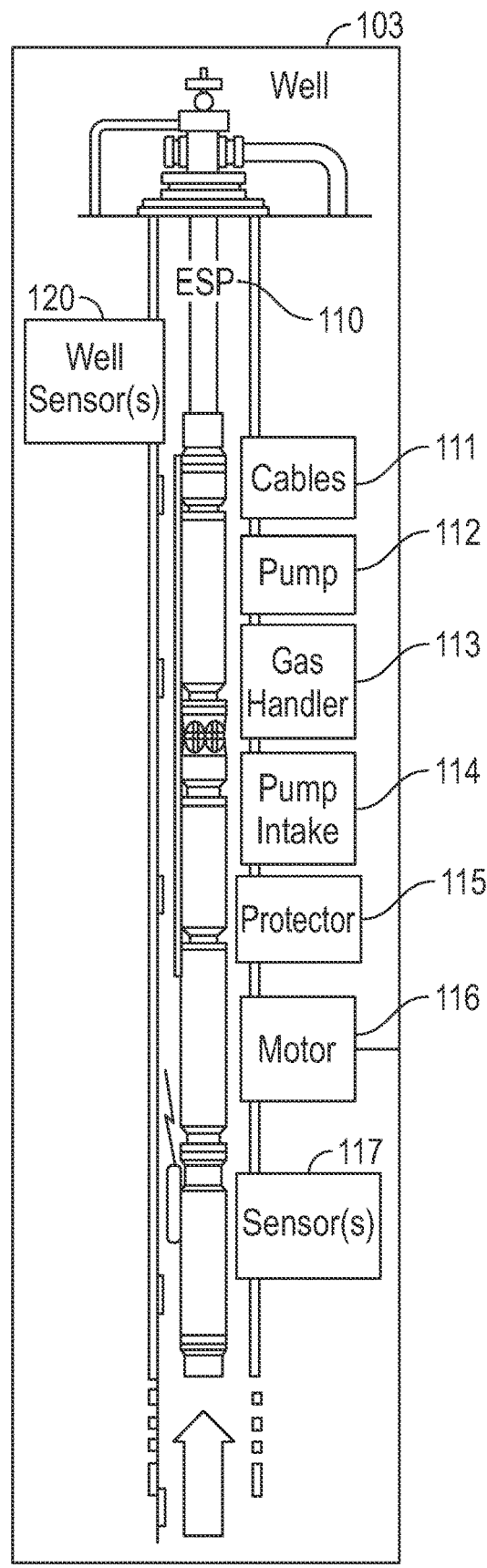
FIG. 1 shows a schematic of an electric submersible pump (ESP) system.

Various types of artificial lift equipment and methods are available, for example, electric submersible pumps (ESP). As shown in the example embodiment of FIG. 1, an ESP 110 typically includes a motor 116, a protector 115, a pump 112, a pump intake 114, and one or more cables 111, which can include an electric power cable. The motor 116 can be powered and controlled by a surface power supply and controller, respectively, via the cables 111. In some configurations, the ESP 110 also includes gas handling features 113 and/or one or more sensors 117 (e.g., for temperature, pressure, current leakage, vibration, etc.). As shown, the well 103 may include one or more well sensors 120.

The pump 112 includes multiple centrifugal pump stages mounted in series within a housing. Each stage includes a rotating impeller and a stationary diffuser. A shaft extends through the pump 112 and is operatively coupled to the motor 116. The shaft can be coupled to the protector 115 (e.g., a shaft of the protector), which in turn can be coupled to the motor 116 (e.g., a shaft of the motor). The impellers are rotationally coupled, e.g., keyed, to the shaft. The diffusers are coupled, e.g., rotationally fixed, to the housing. In use, the motor 116 causes rotation of the shaft (for example, by rotating the protector 115 shaft, which rotates the pump shaft), which in turn rotates the impellers relative to and within the stationary diffusers.

In use, well fluid flows into the first (lowest) stage of the ESP 110 and passes through an impeller, which centrifuges the fluid radially outward such that the fluid gains energy in the form of velocity. Upon exiting the impeller, the fluid makes a sharp turn to enter a diffuser, where the fluid's velocity is converted to pressure. The fluid then enters the next impeller and diffuser stage to repeat the process. As the fluid passes through the pump stages, the fluid incrementally gains pressure until the fluid has sufficient energy to travel to the well surface.

The motors of submersible pumping systems typically include a stator secured within a tubular housing and a rotor secured to a power transmission shaft that rotates within the stator. The rotor typically is made up of a number of rotor sections, the number of rotor sections depending upon the length and power rating of the motor. Generally, each rotor section includes laminated steel plates or disks secured by copper rods. The rotor sections are spaced apart from each other, and a rotor bearing assembly is located between rotor sections and/or at the top and/or bottom of the uppermost and/or lowermost rotor, respectively. Each rotor section is connected to the shaft so that all of the rotor sections rotate as the shaft rotates.

Each rotor bearing assembly acts to support the shaft and to maintain it in proper axial alignment. A rotor bearing assembly includes a sleeve connected to the shaft, so that the sleeve and shaft rotate together, and a journal 64 (e.g., bearing, bushing) disposed coaxially around the sleeve. The journal may be configured to engage, e.g., frictionally engage, an inner wall or surface of the stator (e.g., the inner surface or diameter of stator laminations) to prevent the journal from rotating and to maintain proper alignment of the shaft.

Figure 2B:
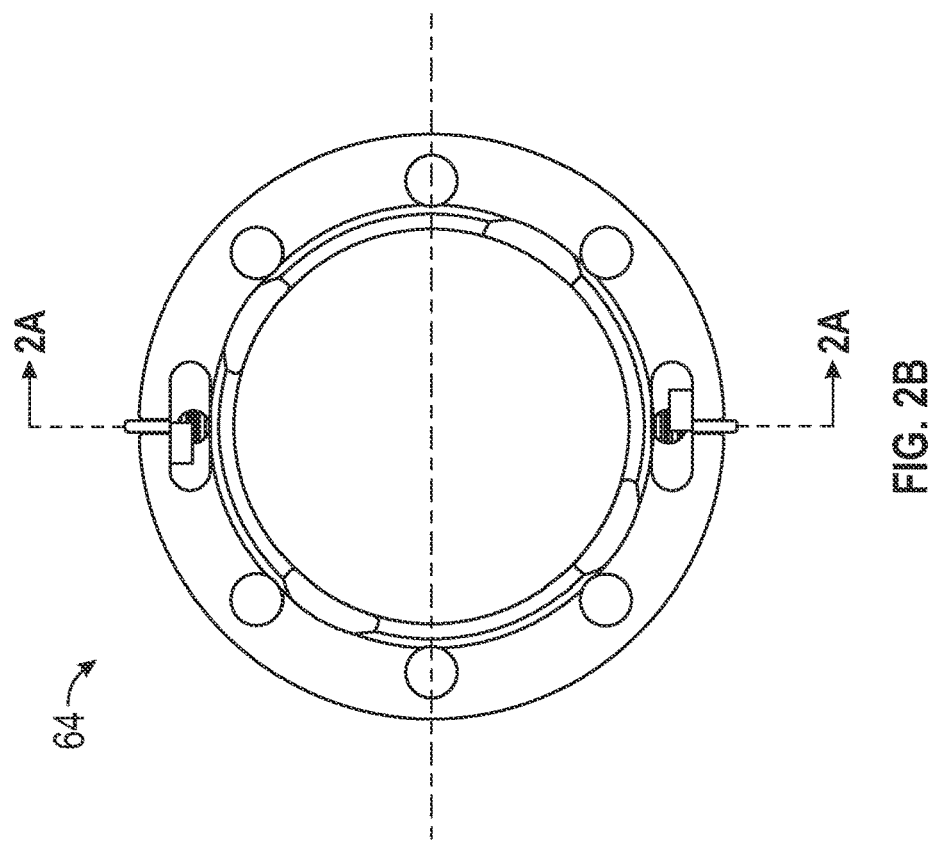
FIGS. 2A and 2B show an example traditional rotor bearing.
Figure 2A:
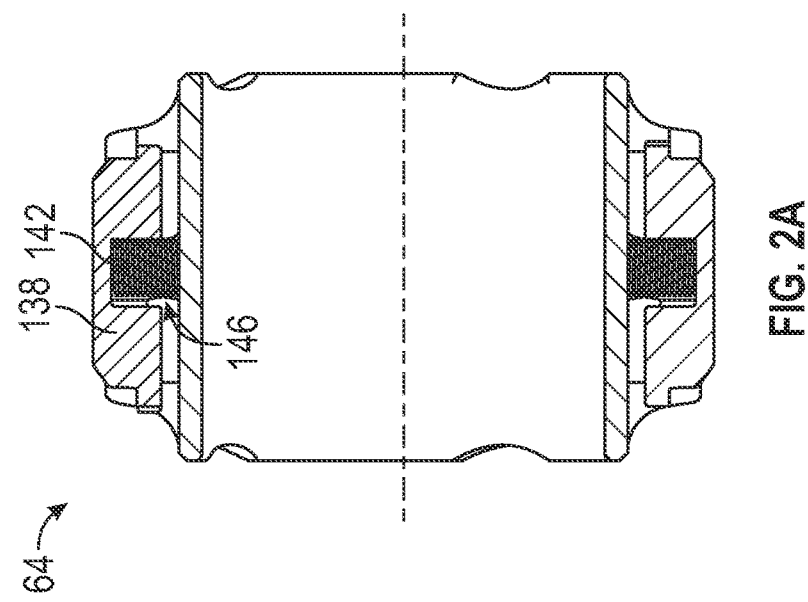

FIGS. 2A and 2B illustrate an example traditional rotor bearing 64. The bearing 64 includes a spring loaded key 138 disposed along an outer surface of the rotor bearing 64. The spring loaded key 138 is biased in a radially outward direction for engagement with a surrounding structure, such as the inner surface or diameter of stator laminations within motor section. The key 138 is biased outwardly by a spring 142 compressed between the outer surface of the rotor bearing 64 and a recess 146 formed in an interior of key 138.

During assembly of the rotor bearing 64 in the motor, the spring 142 is compressed, for example so that the key 138 is flush with the outer diameter of the bearing 64. The bearing 64 can then be pushed inside the stator bore, for example along with the stack of rotor assemblies, without any need to pre-align the key 138. Upon rotation of the shaft, the key 138 automatically engages a corresponding keyway in the stator lamination inner diameter when the key 138 becomes aligned with the keyway. However, as coil compression springs, such as spring 142, require minimum lengths, the bearing 64 may not be accommodated in tight design envelopes and small clearances.

The present application provides rotor bearing anti-rotation key designs that can simplify the assembly of the bearings in the motor and accommodate tighter design envelopes and smaller clearances.

Figure 4:
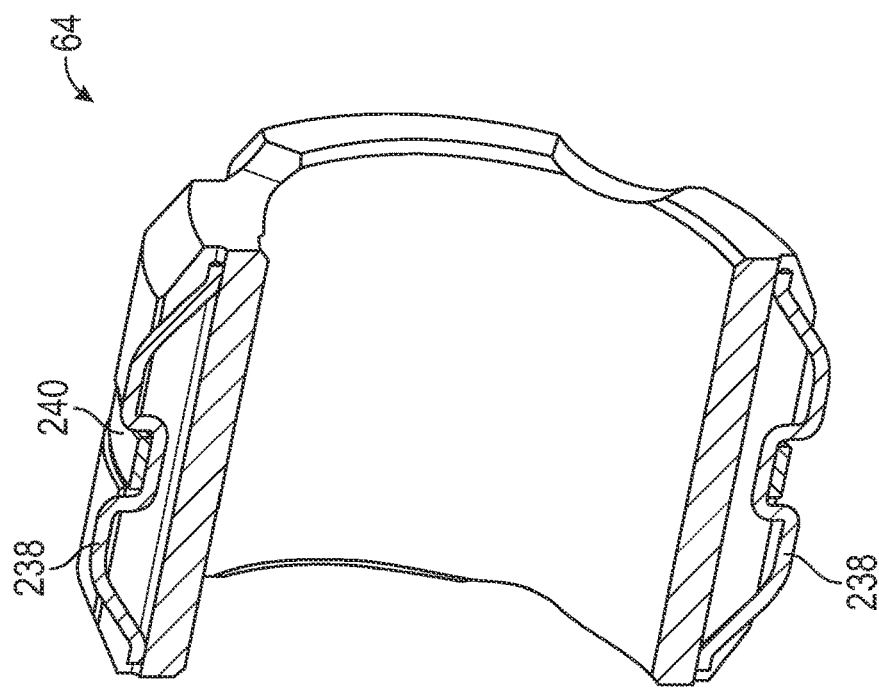
FIG. 4 shows a longitudinal cross-sectional view of the rotor bearing of FIG. 3.
Figure 3:
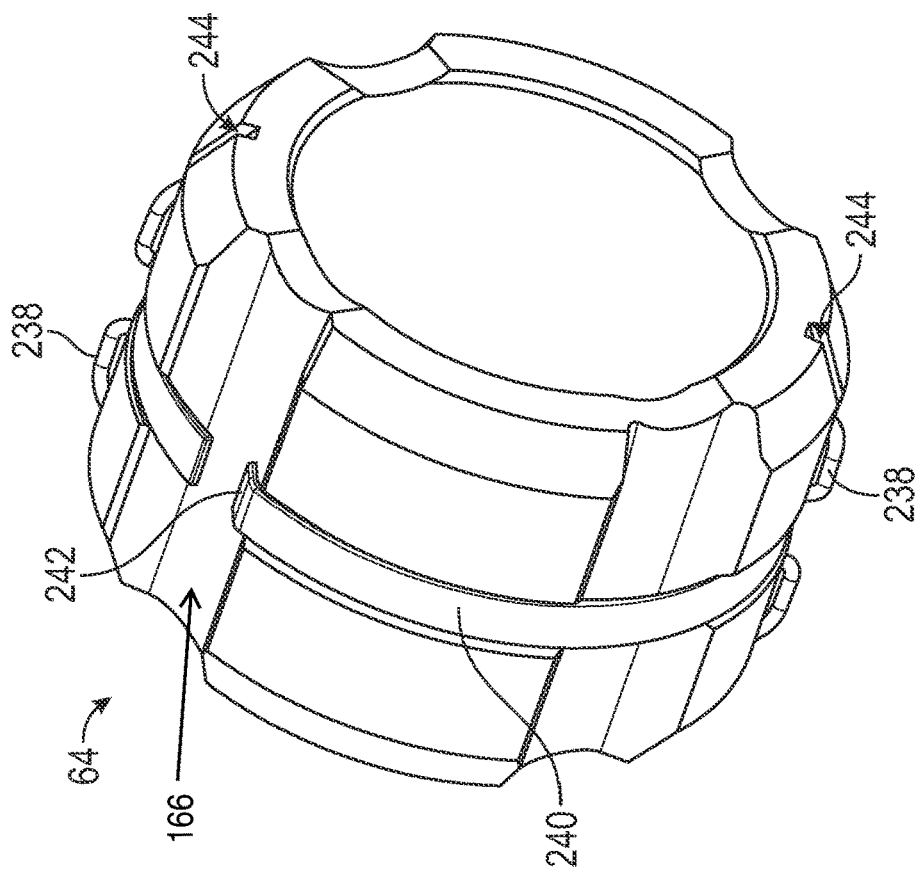
FIG. 3 shows a perspective view of an example rotor bearing.

As shown in FIGS. 3-4, rotor bearings 64 according to the present disclosure include one or more wire anti-rotation keys 238. In the illustrated configuration, the rotor bearing 64 includes two anti-rotation keys 238 disposed 180 degrees around the rotor bearing 64 from each other. The anti-rotation keys 238 can be formed of EA wire. The anti-rotation keys 238 can act as springs. The rotor bearing 64 can also include a retaining ring 240. The retaining ring 240 can secure the key(s) or spring(s) 238 in place during installation and prevent or inhibit the keys 238 from sliding off the bearing 64 axially or radially disengaging from the bearing 64. As shown in FIG. 3, the retaining ring 240 can include a tabbed end 242 that can prevent or inhibit the retaining ring 240 from being displaced during operation. As shown, the tabbed end 242 can be angled radially inward toward the bearing 64 body. As shown, the bearing 64 can include one or more axially extending oil transfer paths or grooves 166 formed in the outer diameter of the bearing body. The tabbed end 242 can extend at least partially into one of the grooves 166.

The illustrated keys 238 extend axially along at least a portion of an axial length of the rotor bearing 64. Each key 238 can be at least partially disposed within a groove 244 formed in an outer surface of the rotor bearing 64 and extending axially along the outer surface of the rotor bearing 64. The retaining ring 240 extends circumferentially around the outer surface of the rotor bearing 64. A portion of each key 238 is disposed radially between the outer surface of the rotor bearing 64 and the retaining ring 240 to secure the key 238 to the rotor bearing 64. A portion of each key 238 is configured to bias radially beyond the outer surface of the rotor bearing 64 and out of the groove 244. The keys 238 are able to compress and/or flatten into the grooves 244.

Figure 6:
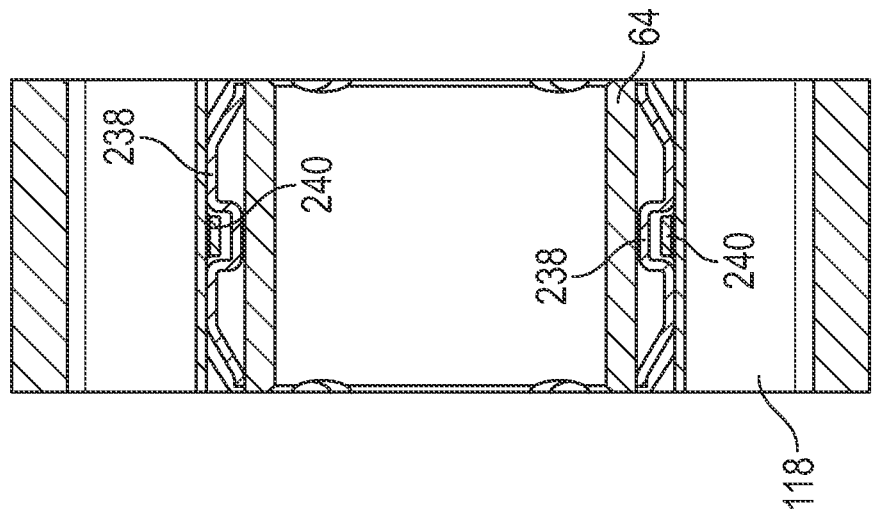
FIG. 6 shows a longitudinal cross-sectional view of the rotor bearing within the stator of FIG. 5 during assembly.
Figure 5:
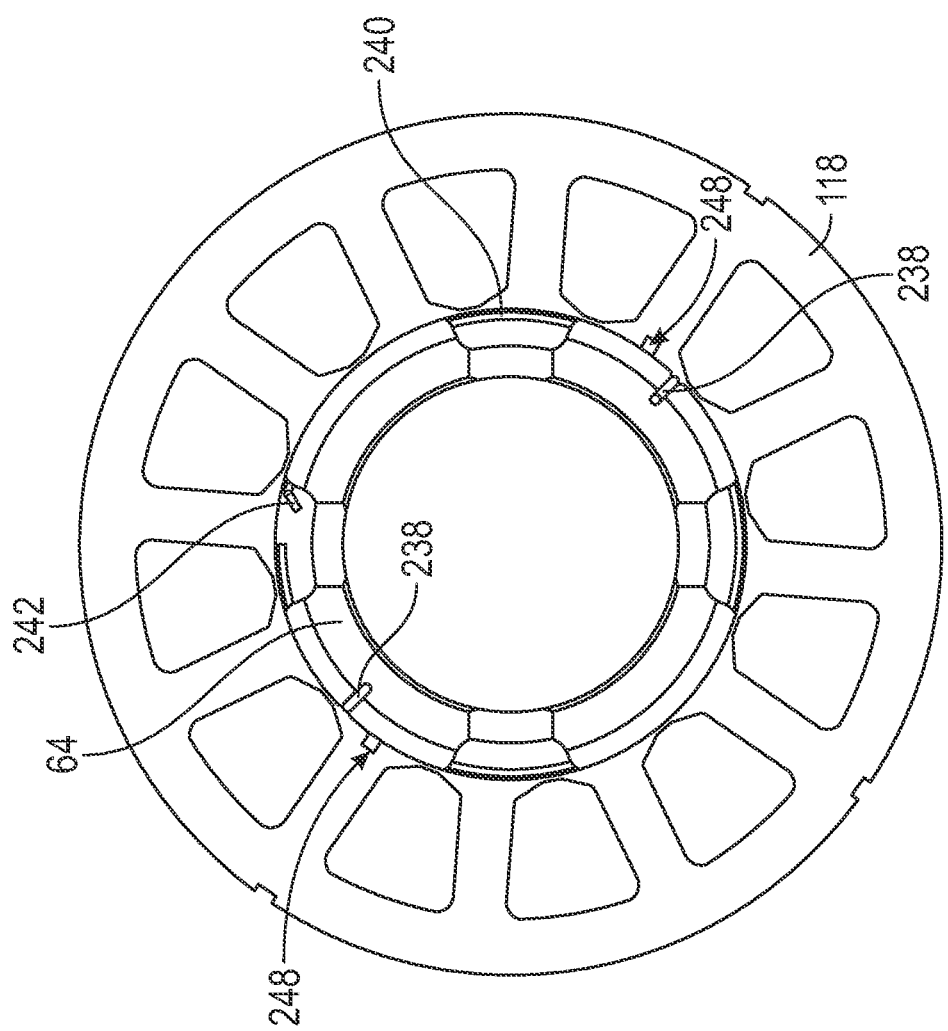
FIG. 5 shows a transverse cross-sectional view of the rotor bearing of FIG. 3 within a stator during assembly.
Figure 8:
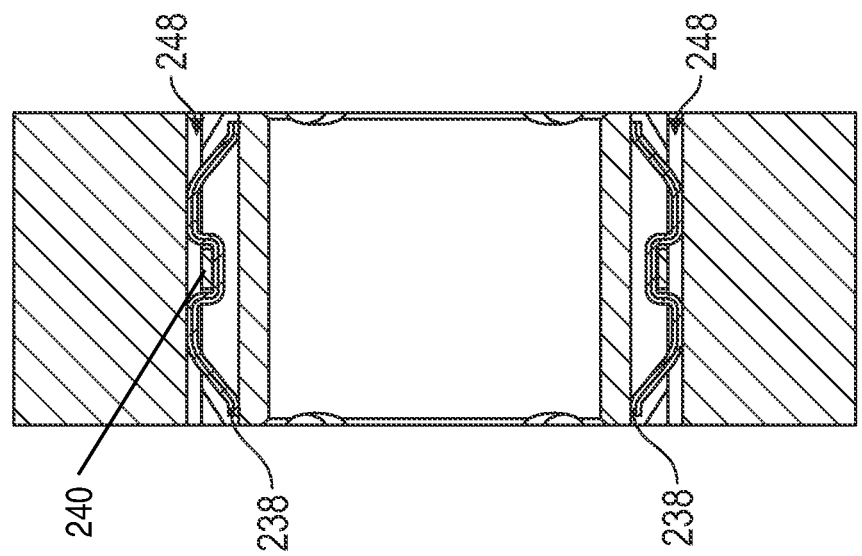
FIG. 8 shows a longitudinal cross-sectional view of the rotor bearing within the stator of FIG. 5 when fully assembled.
Figure 7:
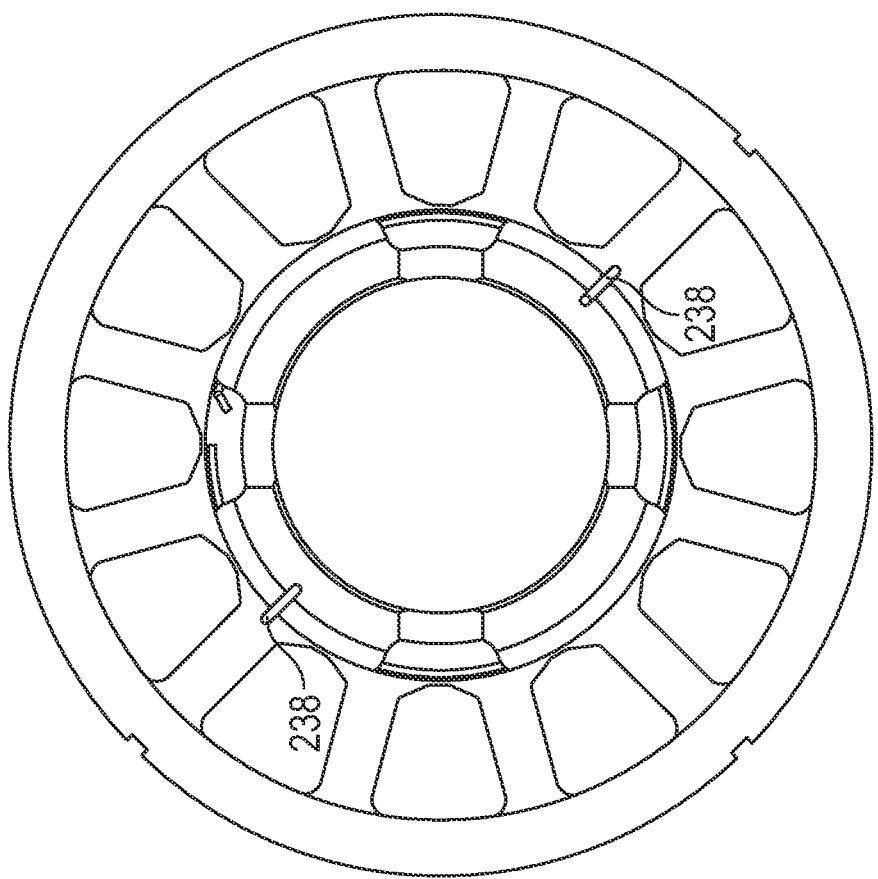
FIG. 7 shows a transverse cross-sectional view of the rotor bearing within the stator of FIG. 5 when fully assembled.

During assembly, the rotor bearing(s) 64 are inserted into the inner diameter or bore of a stator, e.g., stator laminations 118. As shown in FIGS. 5-6, the keys 238 are radially compressed to allow the rotor bearing(s) 64 to be inserted into the stator. The keys 238 can be compressed or flattened such that the keys 238 are flush or generally flush with the outer surface of the rotor bearing 64. The inner diameter of the stator, e.g., of the stator laminations 118, includes one or more recesses or keyways 248. When the rotor bearing 64 is fully assembled with the stator laminations 118, each key 238 is configured to expand into one of the corresponding keyways 248, for example as shown in FIGS. 7-8. Engagement of the keys 238 with the keyways 248 prevents or inhibits relative rotation between the rotor bearing 64 and the stator laminations 118. It is advantageously not required to pre-align (e.g., circumferentially pre-align) the key(s) 238 with the keyways 248. Instead, during motor start-up, the bearings 64 spin until the keys 238 automatically engage the keyways 248, as shown in FIGS. 7-8.

Figure 10:
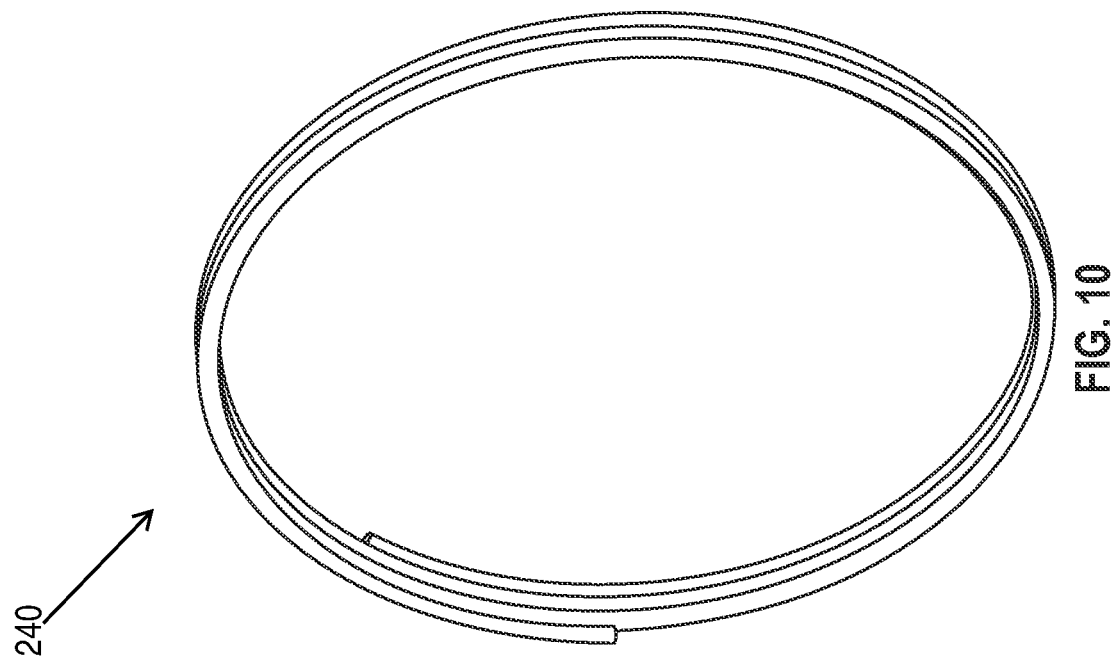
FIG. 10 shows an example retaining ring.
Figure 9:
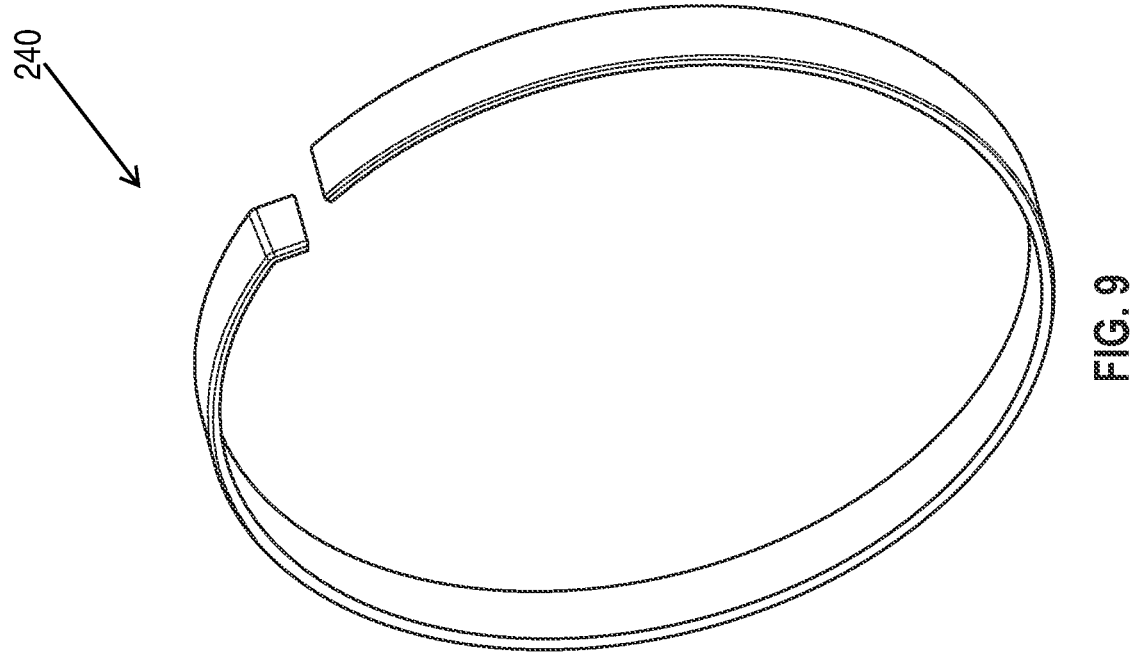
FIG. 9 shows an example retaining ring.

The retaining ring 240 can have various configurations or forms, for example, a hoopster ring as shown in FIG. 9 or a coiled spring wire as shown in FIG. 10. Other retaining mechanism configurations are also possible to secure the key(s) 238 on the rotor bearing 64, such as twisted wires, high-temp tapes, elastomers, etc.

Figure 11:
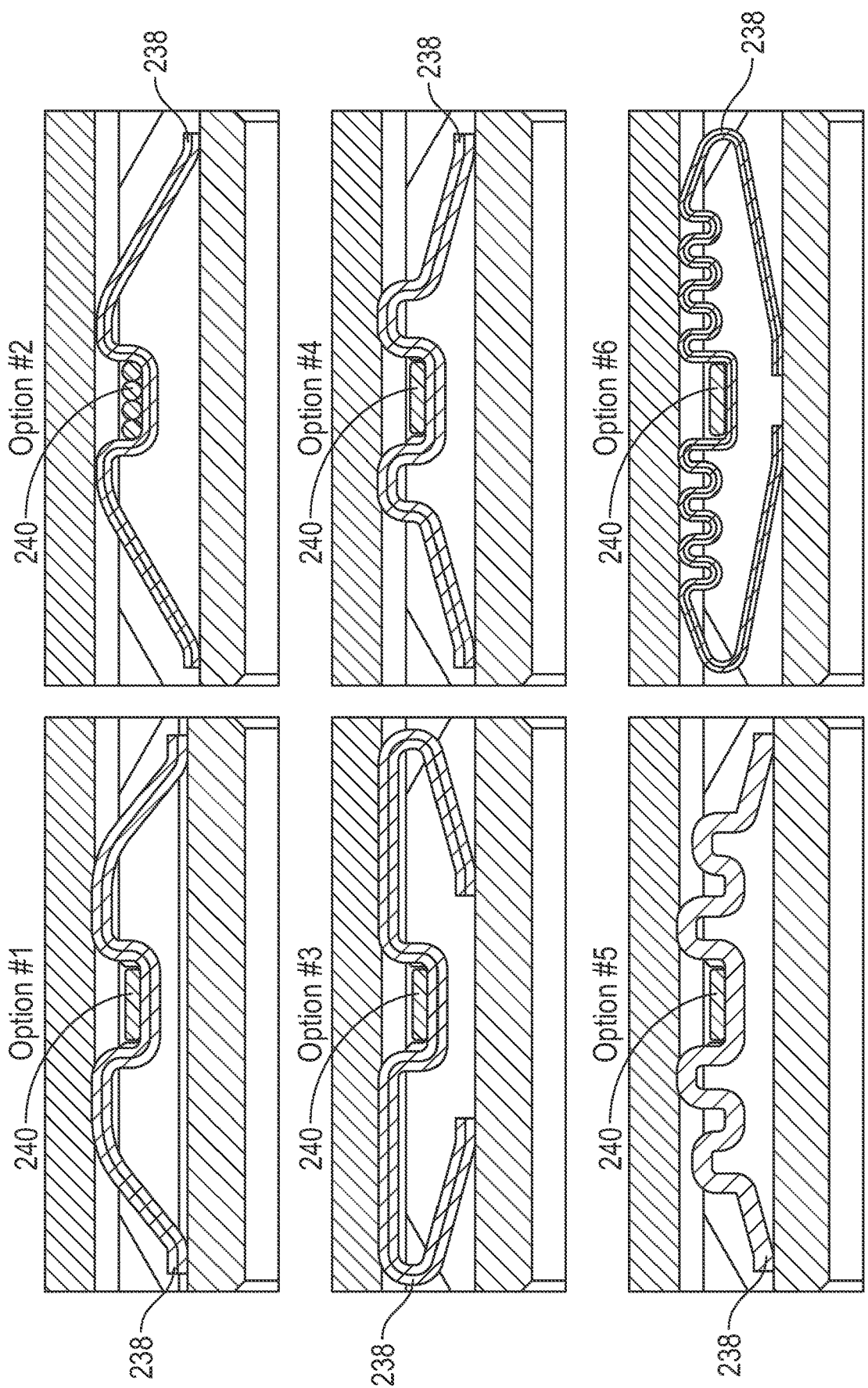
FIG. 11 shows various wire key configurations.

The key(s) 238 can have various configurations, shapes, or forms, for example, various geometries and wire sizes, such as shown in FIG. 11. Various retaining rings 240, such as those shown in FIGS. 9-10, can be used in combination with any of the configurations of keys 238.

Figure 12B:
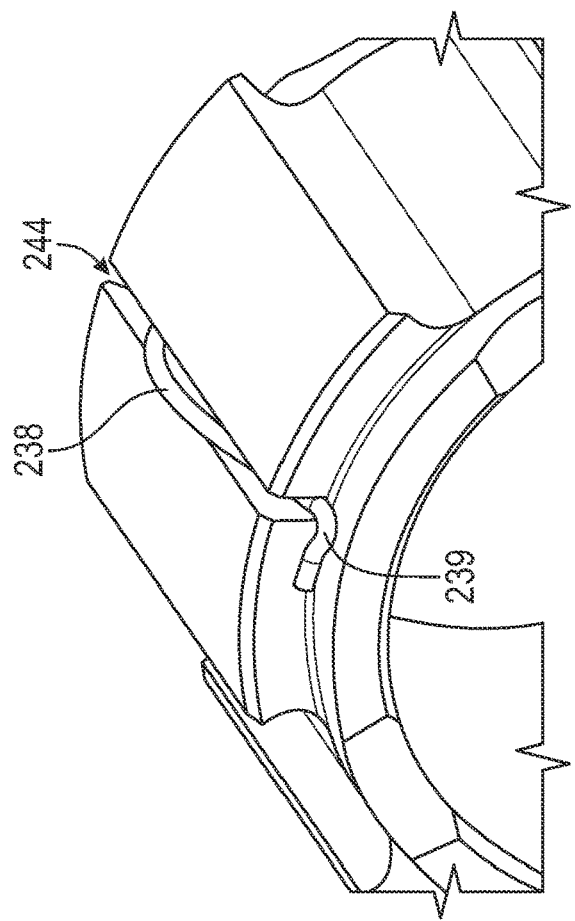
FIG. 12B shows a partial perspective view of the rotor bearing of FIG. 12A.
Figure 12A:
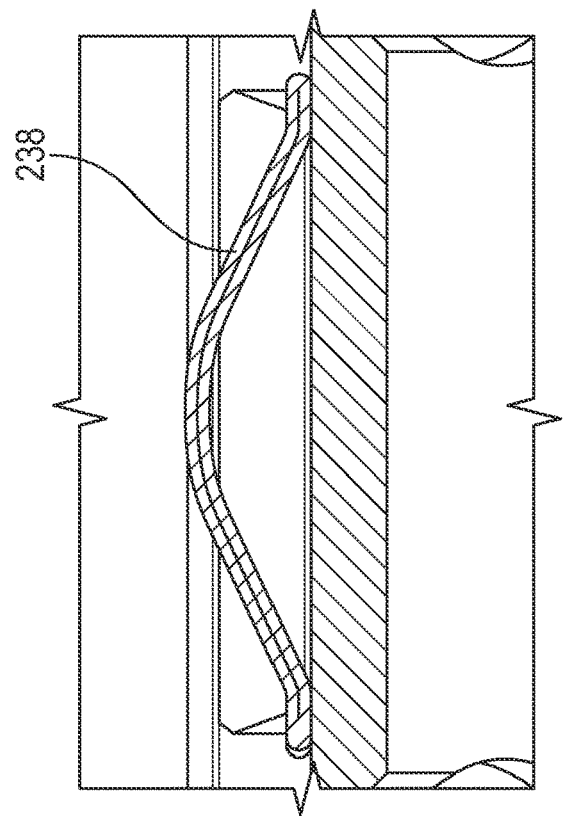
FIG. 12A shows a longitudinal cross-sectional view of an example rotor bearing including a wire key held in place without a retaining ring.
Figure 14:
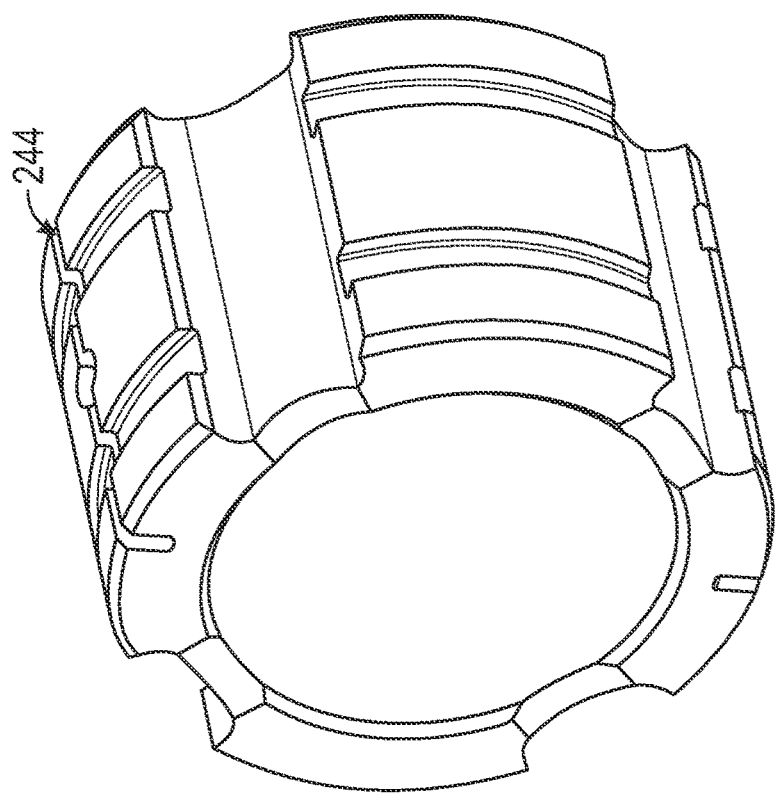
FIG. 14 shows a perspective view of the main body of the rotor bearing of FIG. 13.
Figure 13:
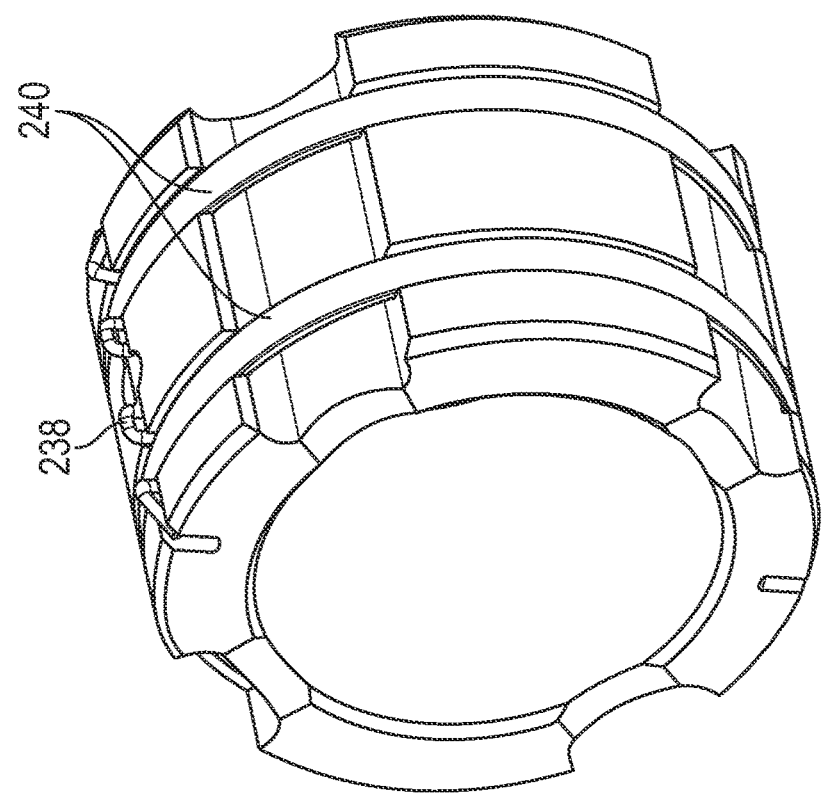
FIG. 13 shows a perspective view of an example rotor bearing including a wire key assembled with springs and retaining rings.

In some configurations, the key 238 can be installed and retained on the rotor bearing 64 without a separate retaining ring 240. For example, FIGS. 12A and 12B illustrate an example configuration in which ends 239 of the key 238 are bent to secure the key 238 in or on the bearing 64. In the illustrated configuration, the end(s) 239 can extend axially beyond the groove 244 and be bent perpendicularly or approximately perpendicularly to the groove 244 (e.g., bent at an angle perpendicular or approximately perpendicular to a line extending through the groove 244 and/or bent so that the ends 239 lie in a plane perpendicular to the axial plane of the groove 244 and portion of the key 238 in the groove) to secure the end 239 against or alongside an axial facing surface of the bearing 64. The bending plane and/or angle can be selected based on application and/or manufacturability considerations.

Figure 15A:
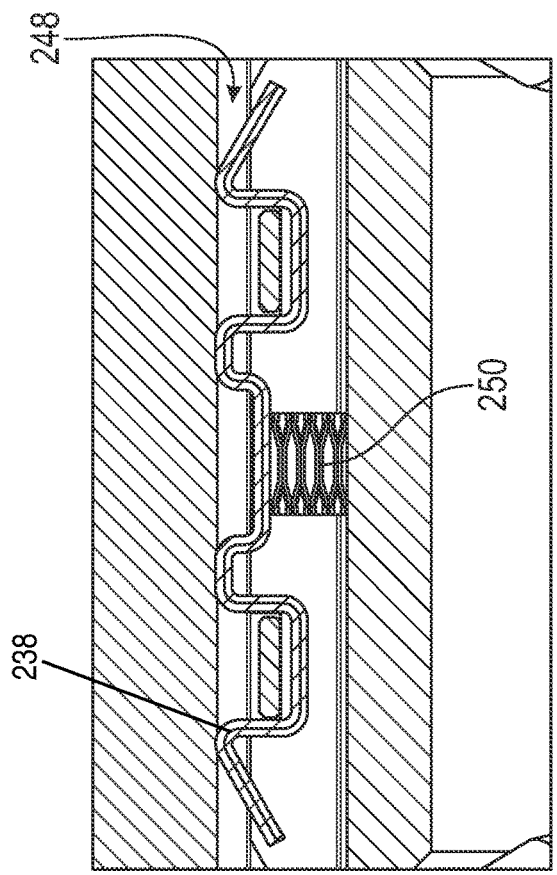
FIG. 15A shows a partial longitudinal cross-sectional view of the rotor bearing of FIG. 13 with the spring in a compressed state.
Figure 15B:
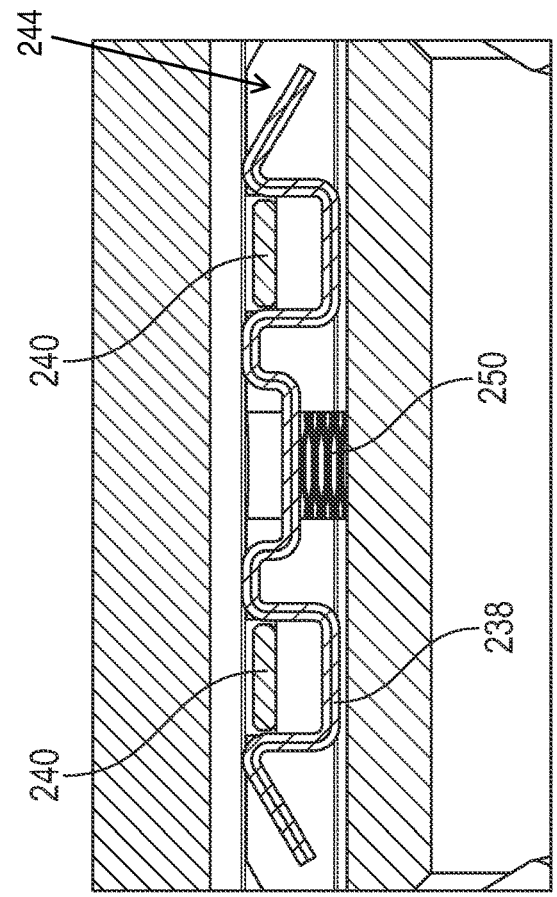
FIG. 15B shows the view of FIG. 15A with the spring in an expanded state.
Figure 16A:
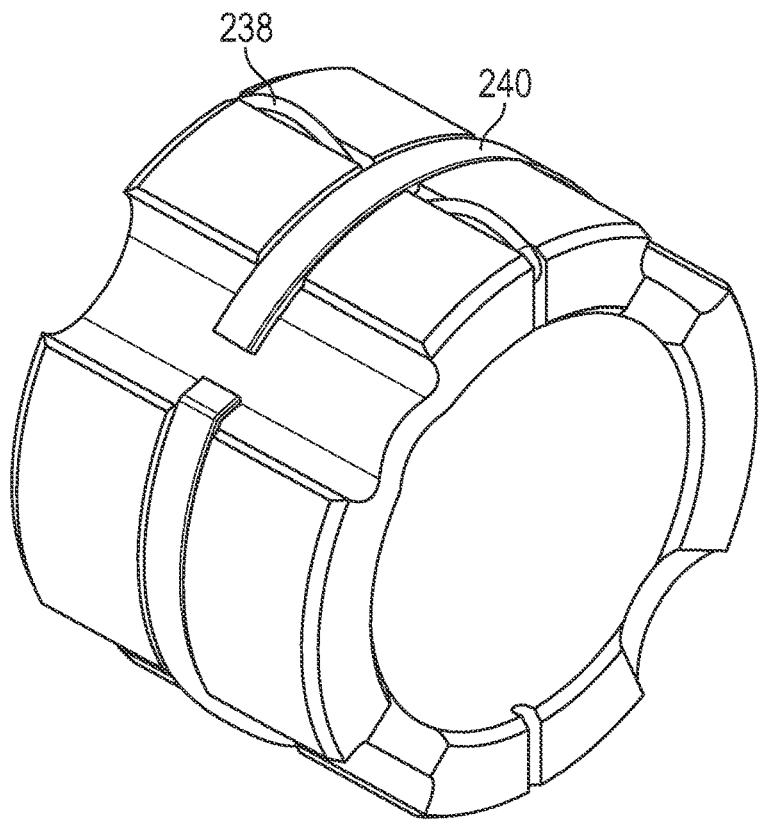
FIG. 16A shows a perspective view of another example rotor bearing including a wire key assembled with springs and a retaining ring.
Figure 16B:
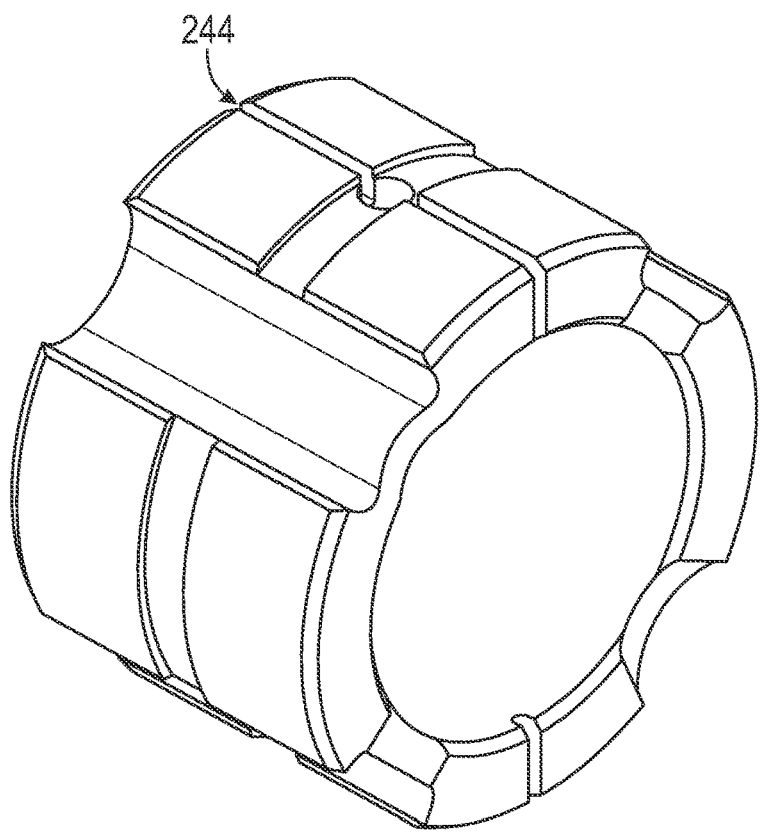
FIG. 16B shows a perspective view of the main body of the rotor bearing of FIG. 16A.
Figure 17B:
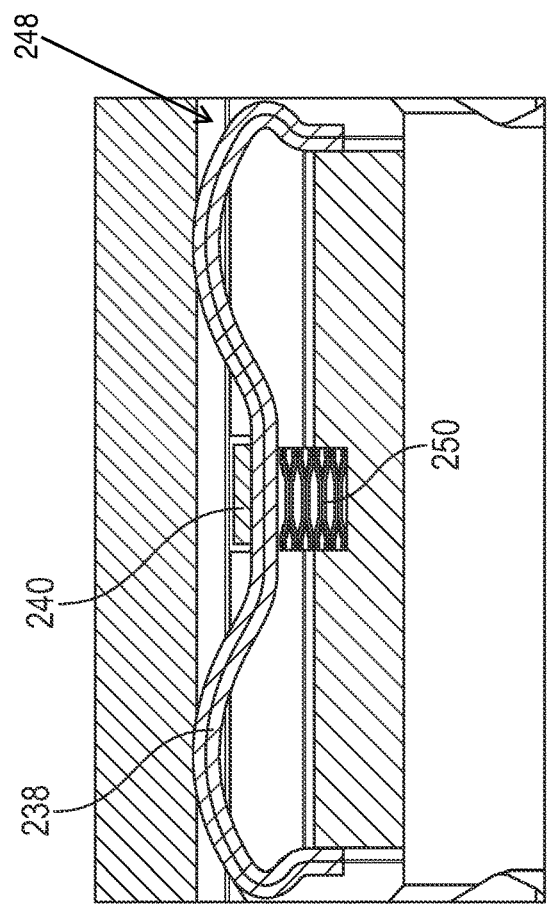
FIG. 17B shows the view of FIG. 17A with the spring in an expanded state.
Figure 17A:
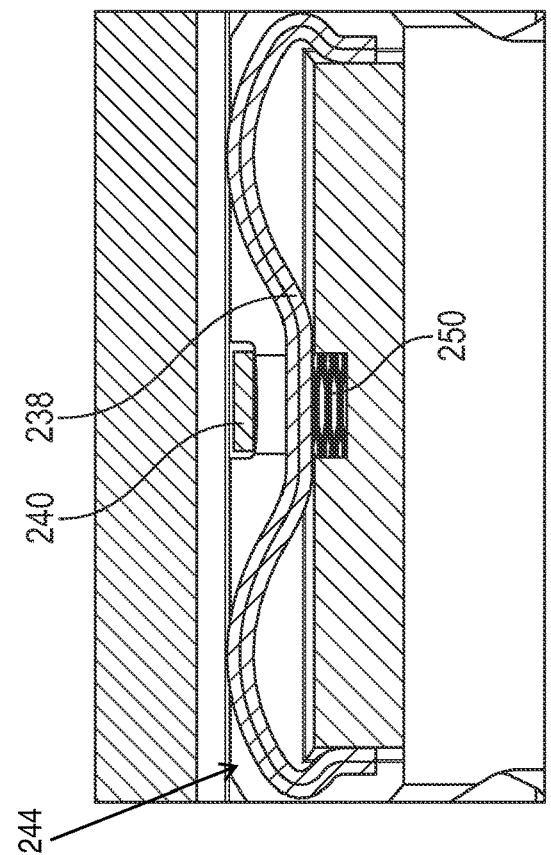
FIG. 17A shows a partial longitudinal cross-sectional view of the rotor bearing of FIG. 16A, with the spring in a compressed state.
Figure 18A:
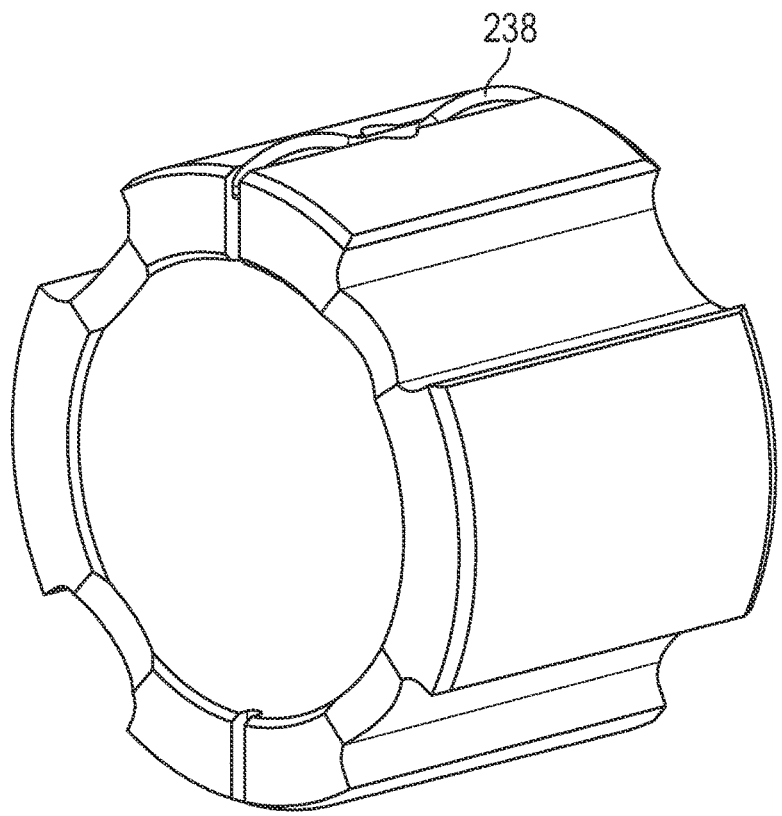
FIG. 18A shows a perspective view of another example rotor bearing including a wire key assembled without a retaining ring.
Figure 18B:
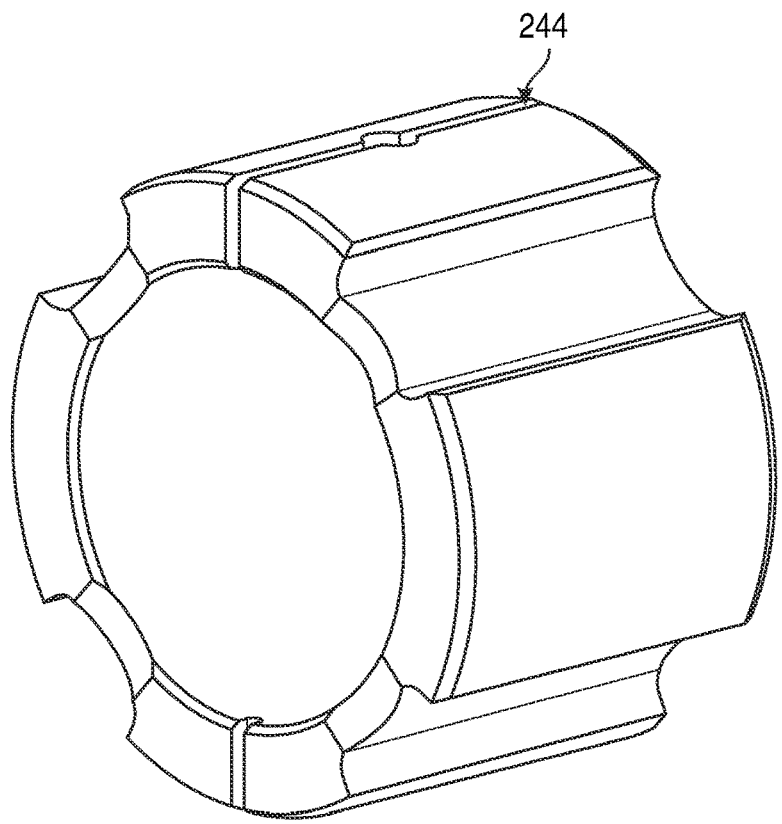
FIG. 18B shows a perspective view of the main body of the rotor bearing of FIG. 18A.
Figure 20:
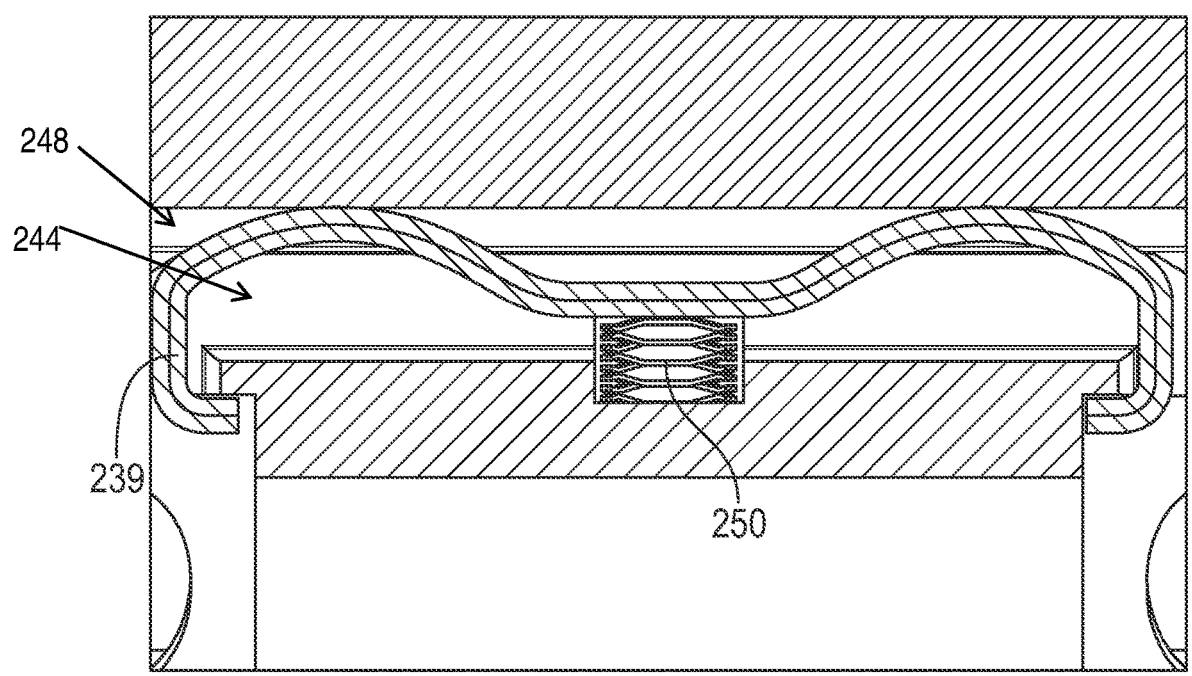
FIG. 20 shows a partial longitudinal cross-sectional view of another example rotor bearing including a wire key assembled without a retaining ring.

As shown in FIGS. 13-15B, in some configurations, the rotor bearing 64 includes one or more keys 238 assembled with one or more springs 250. The spring(s) 250 can be flat wire compression springs to provide the required or desired stiffness. As wave compression springs have a stiffness to volume ratio that is significantly higher than coil springs, use of wave compression springs make it feasible to deploy a spring loaded key 238 within a tight design envelope. During insertion of the rotor bearing 64 into the stator, the spring 250 is compressed, as shown in FIG. 15A, so that the key 238 is within the groove 244. When the key 238 is aligned with the keyway 248 of the stator, the spring 250 expands to bias the key 238 into the keyway 248, as shown in FIG. 15B. One or more retaining rings 240 can secure the keys 238. The configuration illustrated in FIGS. 13-15B includes two retaining rings 240, one on each side of the spring 250. FIGS. 16A-17B illustrate another example configuration including one retaining ring 240 that is radially aligned with the spring 250 such that the key 238 is disposed radially between the spring 250 and the retaining ring 240.

As described herein, other retaining mechanisms, such as thin wire coil spring, twisted wires, high-temp tapes, elastomers, etc., could be used instead of the illustrated retaining ring 240 in any of the bearings 64 shown and/or described herein or according to the present disclosure, for example the bearings 64 shown in FIGS. 13-17B. In some configurations, one or more keys 238 can be assembled with one or more springs 250 and retained on the rotor bearing 64 without a separate retaining ring 240, for example as shown in FIGS. 18A-20. Ends 239 of the key(s) 238 can be bent to secure the key(s) 238, for example, bent at an angle such that the ends 239 extend perpendicularly to the groove 244, bent such that the ends 239 lie in the plane of the groove 244, and/or bent radially inwards toward a center of the bearing 64.

Figure 21:
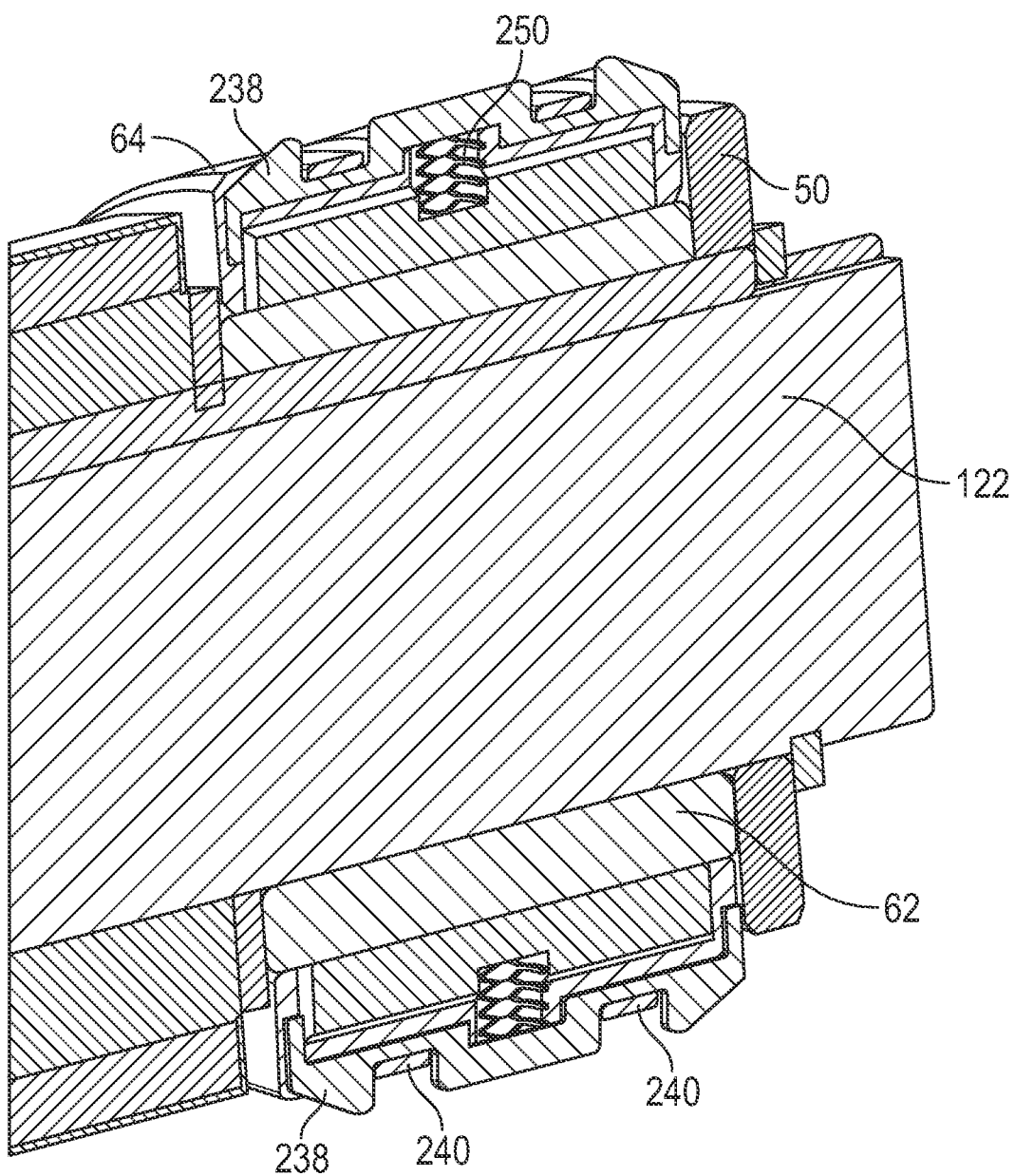
FIG. 21 shows a longitudinal cross-sectional view of an example rotor bearing including stamped metal keys assembled with springs and retaining rings.

In some configurations, the key(s) 238 can be stamped metal, for example as shown in FIG. 21. The illustrated configuration includes wave spring 250 mounted stamped metal keys 238 secured with retaining rings 240. As shown, the retaining rings 240 can be disposed circumferentially about the bearing body such that a portion of the stamped key 238 is disposed radially between the body and the retaining ring 240. During assembly and use, the stamped metal keys 238 can function similarly to the spring 250 mounted and loaded wire keys 238 shown and described herein. As also shown in FIG. 21, the rotor bearing assembly, including the bearing 64 and sleeve 62, are disposed about the motor shaft 122. The sleeve 62 is keyed to the shaft 122 so that the sleeve 62 and shaft 122 rotate together in use. The bearing 64 is disposed about (circumferentially about) the sleeve 62 and rotationally fixed to the stator, for example via the anti-rotation mechanisms described herein, so that the bearing 64 remains rotationally stationary in use. A thrust washer 50 can be disposed circumferentially about the shaft 122 and axially adjacent the thrust bearing assembly as shown.

Figure 22B:
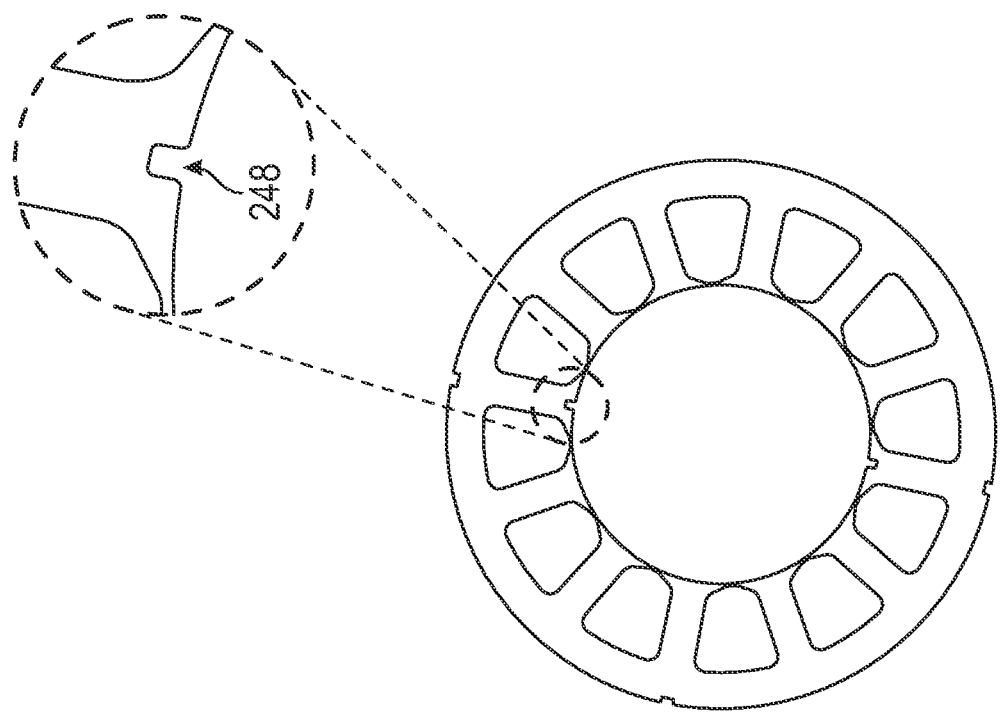
FIG. 22B shows a transverse cross-sectional view of stator laminations including keyways having a square or rectangular profile.
Figure 22A:
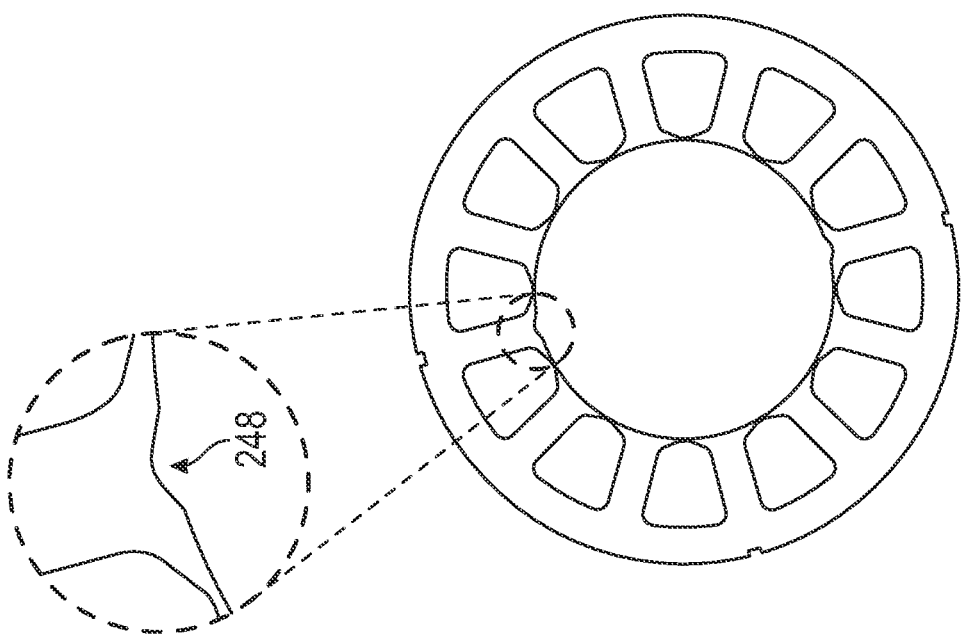
FIG. 22A shows a transverse cross-sectional view of stator laminations including keyways having a rounded profile.

As described herein, the key(s) 238 are configured to be received in a corresponding keyway 248 in the inner diameter of the stator, e.g., stator laminations. In some configurations, for example as shown in FIGS. 5 and 22B, the keyways 248 have a square or rectangular profile with distinct, sharp corners. In other configurations, the keyways 248 may have a more rounded and gradual profile, for example as shown in FIG. 22A. Rounded keyways 248 may be more shallow, which can increase the likelihood of a spring loaded key 238 becoming displaced from the keyway 248 and the bearing 64 therefore not being secured in place.

Figure 23:
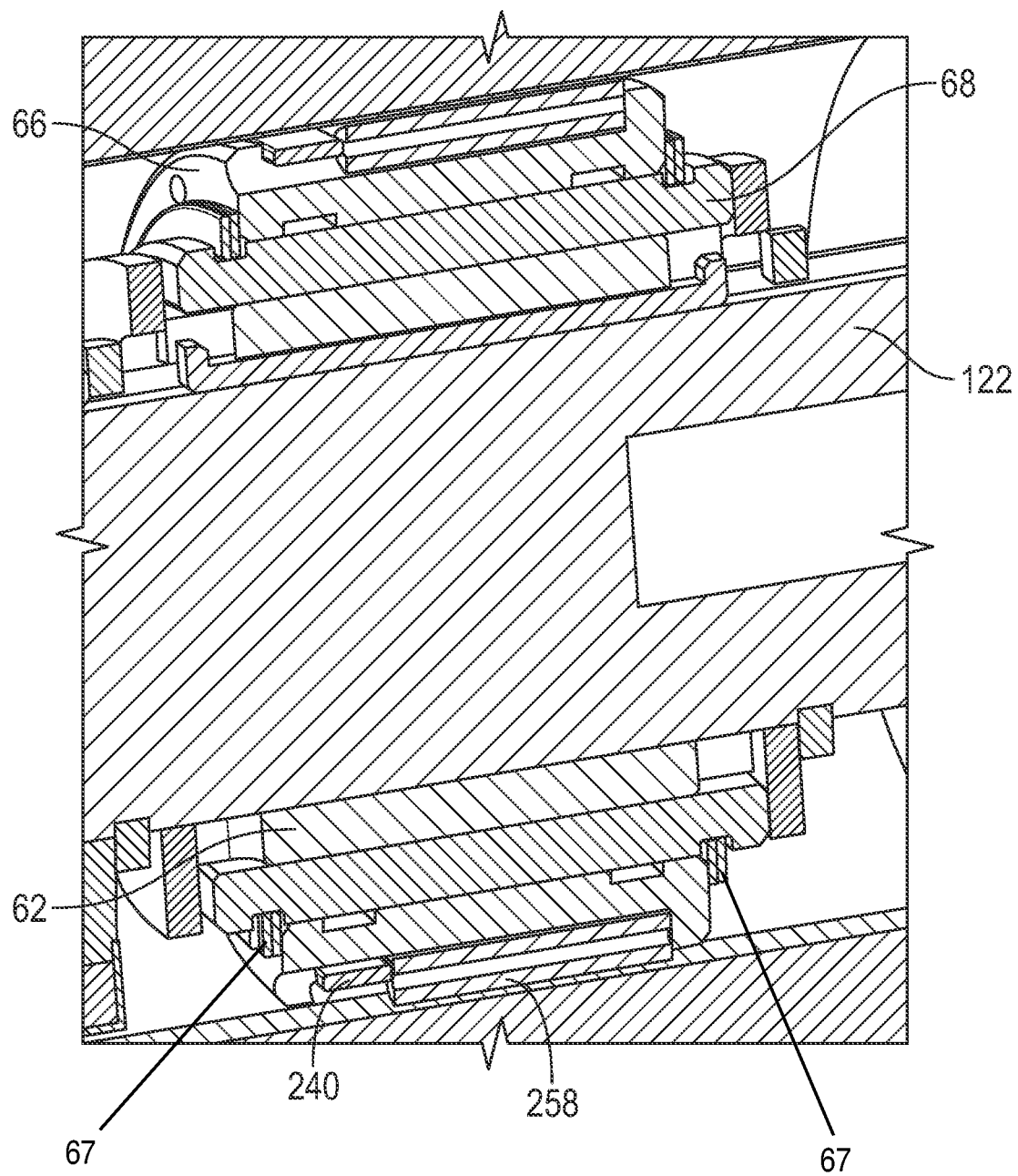
FIG. 23 shows a partial longitudinal cross-sectional view of an example rotor bearing including anti-rotation pins.
Figure 24:
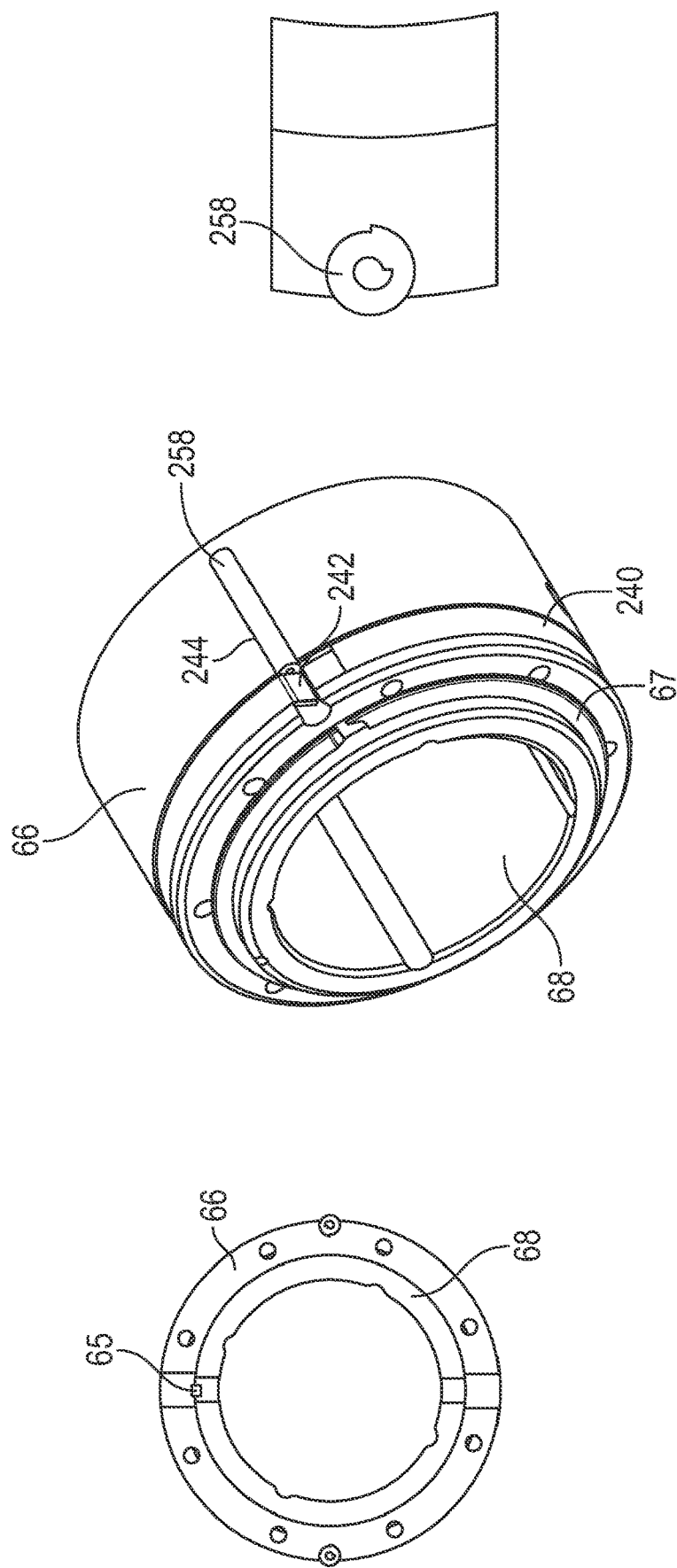
FIG. 24 shows views of the rotor bearing of FIG. 23.

In some configurations, for example for use with a keyway 248 having a more shallow, e.g., rounded, profile as shown in FIG. 22A, a rotor bearing 64 includes one or more anti-rotation pins 258, for example as shown in FIGS. 23-24. The anti-rotation pin 258 can be used instead of a spring-loaded key 238. The anti-rotation pin 258 can be, for example, a solid pin or a coiled pin (for example as shown in FIG. 24) with high torsional stiffness. In some configurations, the pin 258 is installed with an interference fit with respect to or in an alignment hole or groove 244 in the outer surface of the bearing body. As shown, the pins 258 extend axially or longitudinally along the bearing body. One or more pin retaining rings 240 can constrain the pin(s) 258 axially, e.g., within the grooves 244, to prevent or inhibit axial displacement of the pin 258 during motor assembly. As shown, the retaining rings 240 can include a tabbed end 242 that can prevent or inhibit the retaining ring 240 from being displaced during operation. The tabbed end 242 can extend at an angle radially inwardly at least partially into the groove 244. In contrast to a spring-loaded key 238, which can be compressed to be flush with the bearing outer diameter, the anti-rotation pin 258 may always protrude from the bearing outer diameter. The bearing 64 must therefore be pre-aligned with the keyways 248 in the stator laminations prior to assembly.

In the configuration illustrated in FIGS. 23-24, the bearing 64 includes or is made of two pieces—a carrier 66, which may be metallic, and a bushing 68, which may be tungsten carbide (WC) ceramic. In other configurations, the bearing 64 can include or be made of a single piece. A bushing retaining ring 67 can be disposed circumferentially about the bushing 68 at one or each axial end of the carrier 66. The bushing retaining ring(s) 67 can help secure the bushing 68 to the carrier 66. In the illustrated, two-piece configuration, the carrier 66 is disposed circumferentially about the bushing 68. The bearing 64 can include a bushing anti-rotation key 65 as shown in FIG. 24. The bushing anti-rotation key 65 can secure and/or prevent or inhibit relative rotation between the bushing 68 and the carrier 66.

ESP motor bearings, such as the bearings shown and described herein, particularly for high speed and high temperature applications, are often made of tungsten carbide. The coefficient of thermal expansion of tungsten carbide is almost half that of lamination steel. Therefore, the gap between the outer diameter of the bearing and the inner diameter of the stator laminations increases during operation. This increased clearance, which can be up to 0.008" radial at high temperatures, can lead to higher vibration as the bearing body displaces, causing the heavy motor rotors to displace more than the clearances available between the sleeve and the bearing. The increased rotor displacement causes higher unbalance forces and leads to high vibration.

Figure 25A:
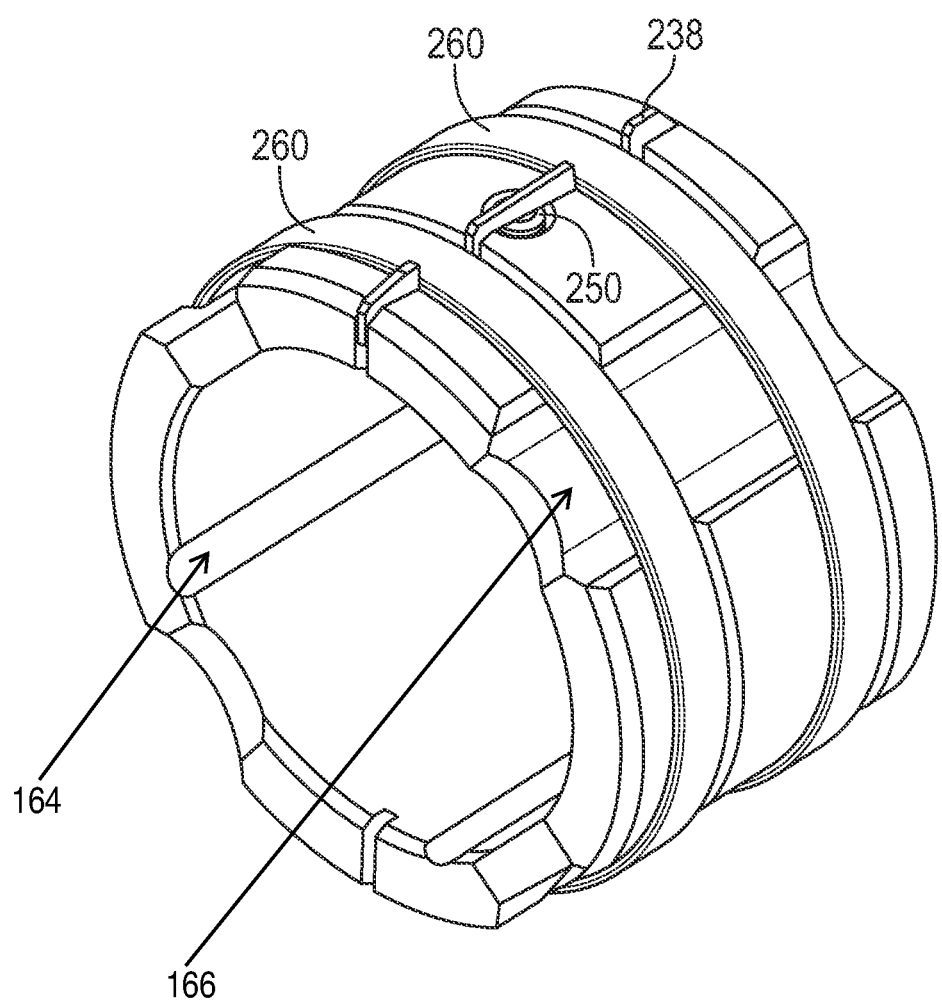
FIG. 25A shows a perspective view of an example rotor bearing including a centering mechanism.

In some configurations according to the present disclosure, a centering mechanism 260 limits displacement of the bearing body in use. The centering mechanism can include one or more elastomer bands or rings, thermoplastic rings, or metallic bands. A centered bearing according to the present disclosure limits displacement of the motor rotors and thereby reduces unbalance forces and vibration. In some configurations, the bearing body has a circular inner diameter profile. In some configurations of the present disclosure, the bearing body has a profiled inner diameter to suppress or inhibit oil whirl-related sub-synchronous ($\frac{1}{2}$×) vibration. For example, FIG. 25A illustrates an example bearing including axial grooves 164 in or on the inner diameter of the bearing body. The grooves 164 can help inhibit such vibration.

Figure 25B:
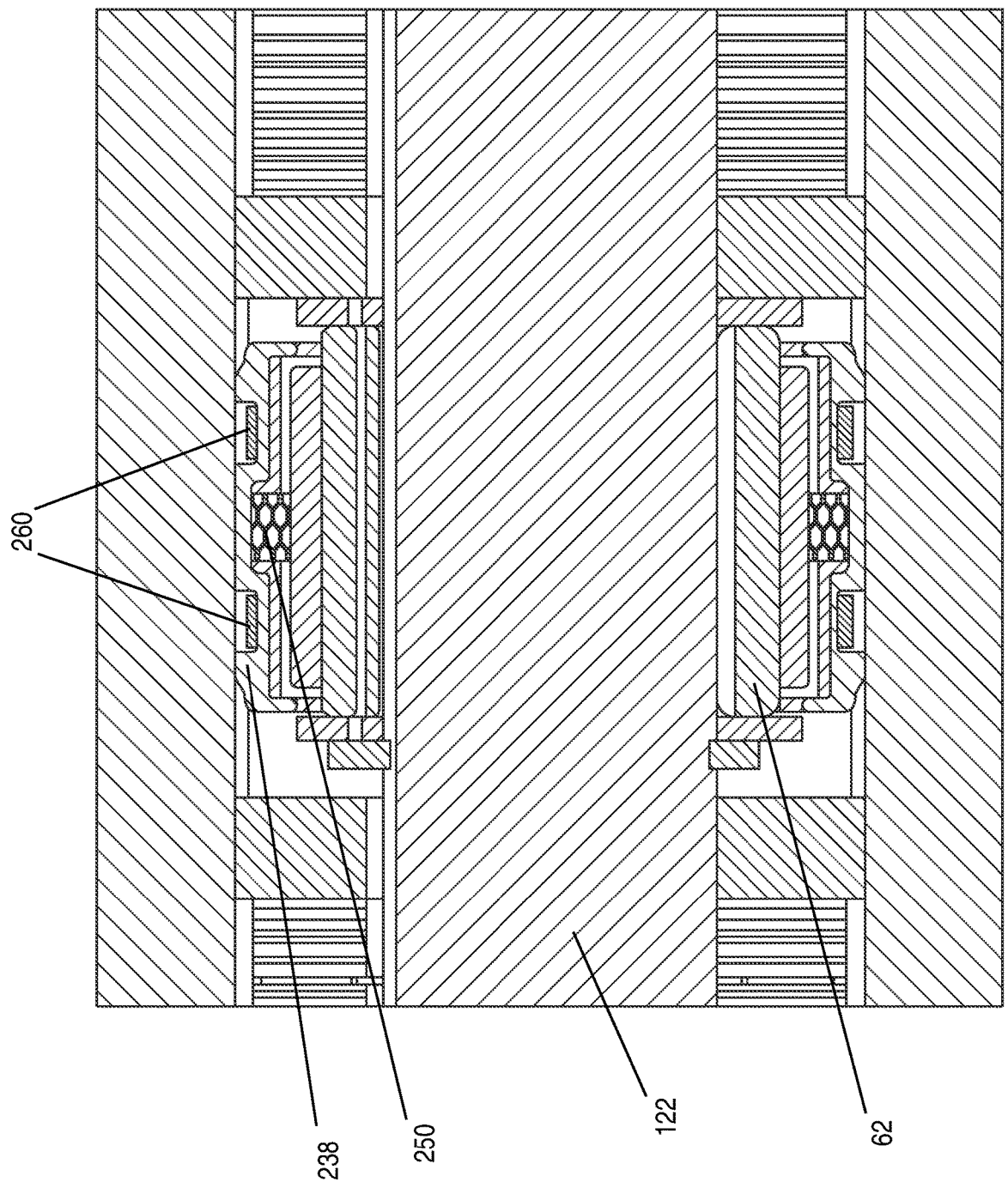
FIG. 25B shows a partial longitudinal cross-sectional view of the rotor bearing of FIG. 25A.

FIGS. 25A-25B illustrate an example bearing 64 including a centering mechanism 260 in the form of two elastomer bands or thermoplastic rings extending circumferentially about the bearing body. The illustrated configuration includes a stamped metal anti-rotation key 238 mounted on a spring 250, although other anti-rotation configurations are possible, for example as shown and described herein. As shown, the bands or rings 260 extend over portions of the key 238 such that portions of the key 238 are radially between the bearing body and one of the bands 260.

The bands or rings 260 can be sized such that there is a clearance between the outer diameter of the bearing and the inner diameter of the stator laminations at room temperature during assembly. At higher temperatures as expected during normal operation, the elastomer of the bands 260 expands due to the elastomer's higher coefficient of thermal expansion compared to the steel laminations. The expanding elastomer contacts the lamination inner diameter, centering the bearing body during operation (for example, via friction interference) and preventing or inhibiting excessive clearance from being formed between the bearing OD and the lamination ID. This is particularly useful when the material of the bearing body has a lower CTE than the lamination steel, as is the case with tungsten carbide which is often used for motor bearings for high speed and high temperature applications. The elastomer for the centering mechanism 260 can be selected such that it retains its elastomeric property at the high temperatures expected to be seen in the motor in use, for example, Chemraz 562. As the anti-rotation key or pin 238 is engaged with the stator laminations at all times after assembly and during operation, there is no relative rotation between the bands or rings 260 and the lamination, even prior to expansion of the elastomer.

Figure 27A:
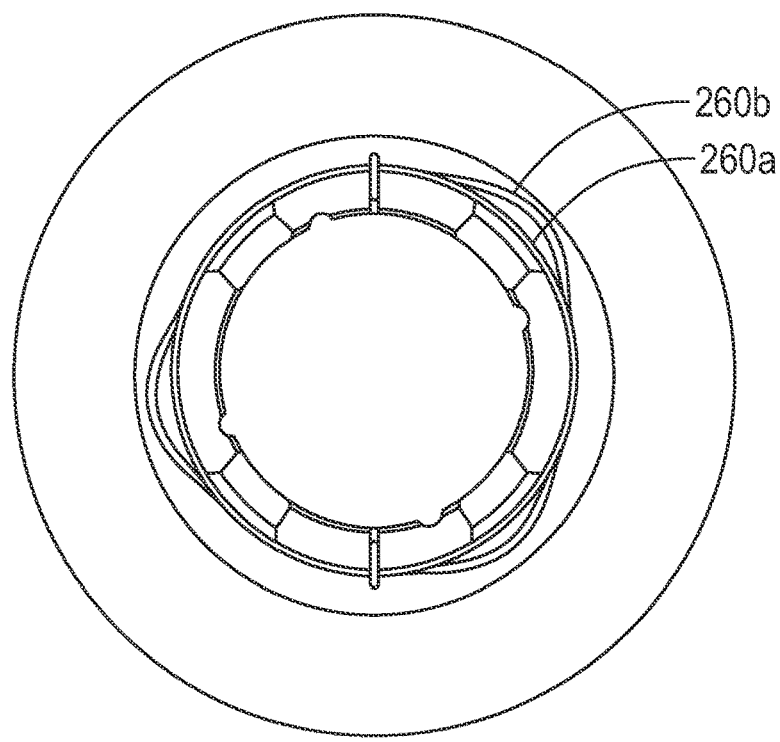
FIG. 27A shows a transverse cross-sectional view of an example rotor bearing including a retaining ring made of a high CTE material installed in a stator.
Figure 27B:
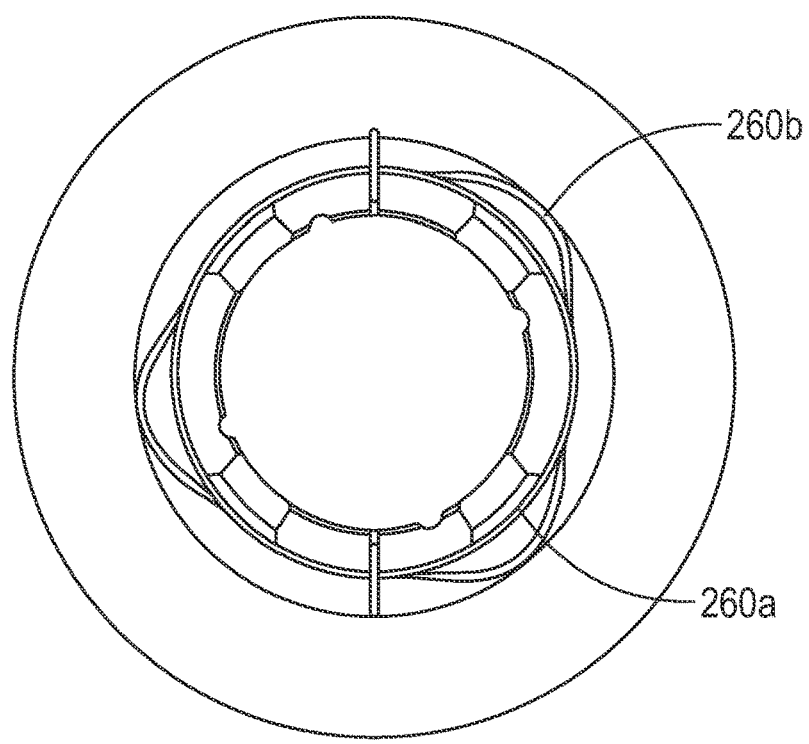
FIG. 27B shows the rotor bearing of FIG. 27A with the high CTE material retaining ring expanded to contact the stator inner diameter.

In some configurations, the centering mechanism 260 can take the form of retaining rings with high CTE material bands 260b attached to underlying retaining rings 260a, for example as shown in FIGS. 27A-27B. For example, high CTE material bands can be rigidly attached, e.g., welded, to the retaining rings. The bands can be sized such that there is clearance between the bearing assembly and the ID of the laminations at room temperature during assembly. At higher temperatures as normally seen during operation, the high CTE material bands expand due to the higher CTE compared to the laminations and underlying retaining ring material. The expanding band(s) act as springs and engage the lamination ID, for example as shown in FIG. 27B, to center the bearing body. Therefore, displacement of the bearing body is reduced or limited, resulting in lower rotor displacement and lower 1× vibration.

In some configurations, the centering mechanism 260 can be made of or include SMA (shape memory alloy) material. For example, a retaining ring 260 can be made of an SMA material that is originally expanded as shown in FIG. 28B. The material can be deformed at room temperature to fit inside the stator laminations during assembly, as shown in FIG. 28A. When the motor starts to operate, the internal temperature increases. At operating temperature, the retaining ring(s) 260 expand, as shown in FIG. 28B, to occupy the clearance between the bearing and the lamination ID and inhibit or prevent movement of the bearing body. The alloy material and transition temperature can be selected such that the retaining ring 260 acquires the desired shape when the motor operates at the intended frequency. The alloy material and transition temperature can also be selected such that the retaining ring 260 is restored to the deformed shape when cooled down to room temperature so that the motor can be dismantled.

Figure 26B:
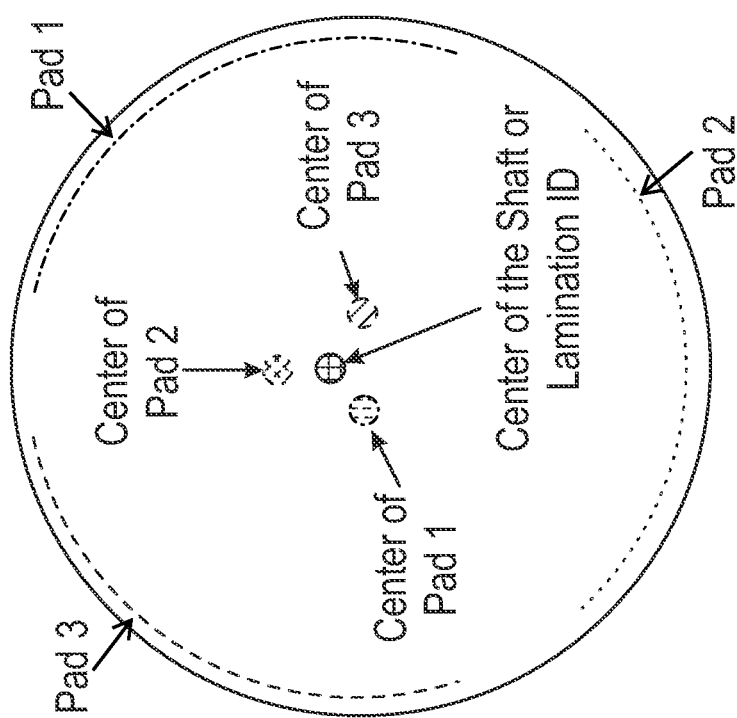
FIG. 26B schematically shows a modified bearing inner diameter profile.
Figure 26A:
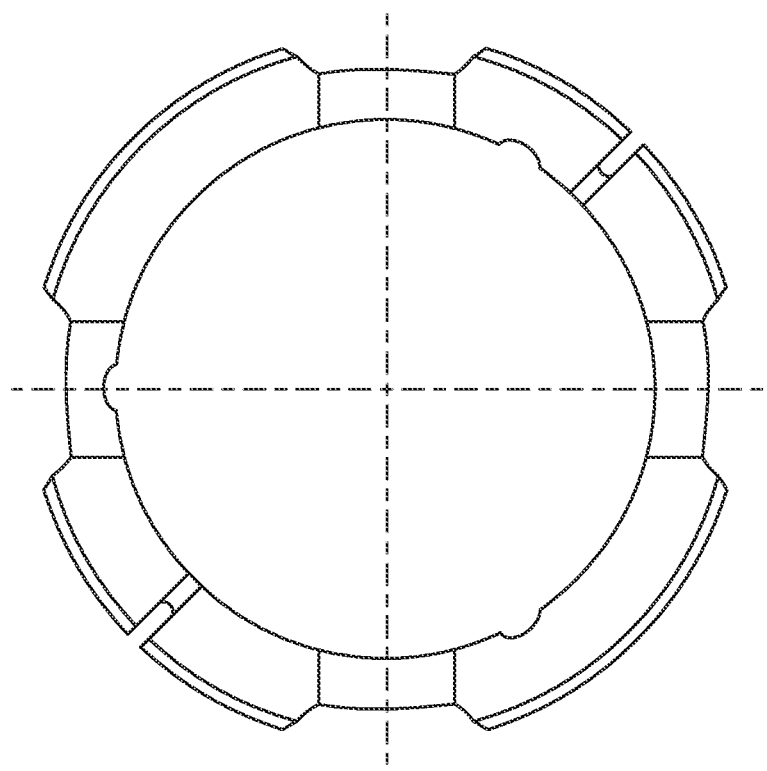
FIG. 26A shows a transverse cross-sectional of an example rotor bearing body.

In use, motor rotors, particularly induction motor rotors, are susceptible to high sub-synchronous (½×) or oil related vibration at high speeds. To suppress the oil whirl related vibration, the bearing 64 can include a profiled inner diameter that increases preloading of the bearing. For example, FIG. 25A illustrates an example bearing including axial grooves 164 in or on the inner diameter of the bearing body. FIGS. 26A-26B illustrate another example profile for inhibiting oil related vibration. The inner diameter of the bearing 64 or bushing 68 can include one or more bearing pads that contact or face the sleeve 62 of the rotor bearing assembly. Preloading can be achieved by displacing the bearing pad centers away from the centers of the shaft, journal or bearing 64, and/or stator laminations, for example as shown in FIGS. 26A-26B. Typically, in a cylindrical bearing design, the centers of the pads and shaft center coincide with each other. In a trilobe bearing design, for example as illustrated, the pads are moved radially so that they are closer to the shaft, thereby shifting the bearing pad centers away from the shaft center to achieve preloading. The amount of the radial displacement of the bearing pad centers can be selected to reduce oil whirl vibrations without compromising the load capacity of the bearings. In some configurations, a preloaded trilobe bearing design can include a centering mechanism 260 so that both 1× (caused by unbalance) and ½× vibrations are suppressed.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately," "about," "generally," and "substantially" may refer to an amount that is within less than 10% of, within less than 5% of, within less than 1% of, within less than 0.1% of, and/or within less than 0.01% of the stated amount. As another example, in certain embodiments, the terms "generally parallel" and "substantially parallel" or "generally perpendicular" and "substantially perpendicular" refer to a value, amount, or characteristic that departs from exactly parallel or perpendicular, respectively, by less than or equal to 15 degrees, 10 degrees, 5 degrees, 3 degrees, 1 degree, or 0.1 degree.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims. It is also contemplated that various combinations or sub-combinations of the specific features and aspects of the embodiments described may be made and still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above.

What is claimed is:

1. A motor bearing comprising:
    a body;
    an anti-rotation feature projecting radially outwardly from an outer surface of the body, the anti-rotation feature configured to be received in a corresponding keyway in an inner surface of a motor stator, and the anti-rotation feature comprising a spring-loaded stamped key; and at least one retaining ring configured to secure the stamped key to the body, the at least one retaining ring disposed circumferentially about the stamped key such that a portion of the stamped key is disposed radially between the body and the at least one retaining ring.

2. The motor bearing of claim 1, wherein the body comprises a groove in the outer surface of the body, the groove extends axially along a length of the body, and the stamped key is disposed partially in the groove.

3. The motor bearing of claim 1, a wherein the at least one retaining ring is further disposed circumferentially about the outer surface of the body and configured to axially constrain the stamped key.

4. The motor bearing of claim 1, further comprising a centering mechanism configured to limit displacement of the motor bearing relative to the stator in use, wherein the centering mechanism includes the at least one retaining ring.

5. The motor bearing of claim 4, wherein the at least one retaining ring comprises an elastomer band or thermoplastic rings.

6. The motor bearing of claim 4, wherein the at least one retaining ring comprises a metallic band.

7. The motor bearing of claim 4, wherein the at least one retaining ring is made of a shape memory alloy.

8. The motor bearing of claim 1, wherein an inner surface of the body comprises a circular profile or a non-circular profile configured to inhibit sub-synchronous or oil whirl related vibration.

9. The motor bearing of claim 1, wherein the body is comprised entirely of tungsten carbide ceramic.

10. An electric submersible pump motor comprising the motor bearing of claim 1.

11. A motor bearing comprising:

a body;

an anti-rotation feature projecting radially outwardly from an outer surface of the body, the anti-rotation feature configured to be received in a corresponding keyway in an inner surface of a motor stator; and a retaining ring disposed circumferentially about the outer surface of the body and configured to axially constrain the anti-rotation feature.

12. The motor bearing of claim 11, wherein the body comprises a groove in the outer surface of the body, the groove extends axially along a length of the body, and the anti-rotation feature is disposed partially in the groove.

13. The motor bearing of claim 11, wherein an inner surface of the body comprises a circular profile or a non-circular profile configured to inhibit sub-synchronous or oil whirl related vibration.

14. The motor bearing of claim 11, wherein the body is comprised entirely of tungsten carbide ceramic.

15. An electric submersible pump motor comprising the motor bearing of claim 11.

16. The motor bearing of claim 11, wherein the retaining ring comprises an elastomer band or a thermoplastic ring.

17. The motor bearing of claim 11, wherein the retaining ring comprises a metallic band.

18. The motor bearing of claim 11, wherein the retaining ring is made of a shape memory alloy.

* * * * *